United States Patent [19]
Hazlehurst et al.

[11] Patent Number: 5,974,412
[45] Date of Patent: Oct. 26, 1999

[54] INTELLIGENT QUERY SYSTEM FOR AUTOMATICALLY INDEXING INFORMATION IN A DATABASE AND AUTOMATICALLY CATEGORIZING USERS

[75] Inventors: Brian L. Hazlehurst, Portland; Scott M. Burke, Corvallis; Kristopher E. Nybakken, Portland, all of Oreg.

[73] Assignee: Sapient Health Network, Portland, Oreg.

[21] Appl. No.: 08/936,354

[22] Filed: Sep. 24, 1997

[51] Int. Cl.⁶ .................................................. G06F 17/00
[52] U.S. Cl. .................................. 707/3; 707/10; 707/102
[58] Field of Search .................................. 707/2, 10, 102, 707/532, 3; 704/9, 241; 382/159; 345/440

[56] References Cited

U.S. PATENT DOCUMENTS

| | | | |
|---|---|---|---|
| 5,479,523 | 12/1995 | Gaborski et al. | 382/159 |
| 5,619,709 | 4/1997 | Caid et al. . | |
| 5,625,767 | 4/1997 | Bartell et al. | 345/440 |
| 5,696,877 | 12/1997 | Iso | 704/241 |
| 5,794,178 | 8/1998 | Caid et al. | 704/9 |
| 5,835,758 | 11/1998 | Nochur et al. | 707/102 |
| 5,852,820 | 11/1998 | Burrows | 707/2 |
| 5,857,179 | 1/1999 | Vaithyanathan et al. | 707/2 |
| 5,864,855 | 1/1999 | Ruocco et al. | 707/10 |

OTHER PUBLICATIONS

*Parallel Distributed Processing, Explorations in the Microstructure of Cognition, Vol. 1: Foundations*, written by David E. Rumelhart, James L. McClelland and the PDP Research Group, The Massachusetts Institute of Technology, 1986.

*The ART of Adaptive Pattern Recognition by a Self–Organizing Neural Network*, written by Gail A. Carpenter and Stephen Grossberg, Boston University, IEEE 1988.

*Automatic Text Processing, The Transformation, Analysis, and Retrieval of Information by Computer*, written by Gerard Salton, Cornell University, 1989.

*The Self–Organizing Map*, written by Teuvo Kohonen, Senior Member, IEEE, Proceedings of the IEEE, vol. 78, No. 9, Sep. 1990.

*Annual Review of Information Science and Technology*, vol. 25, Edited by Martha E. Williams, University of Illinois, published by the American Society for Information Science, 1990.

*Information Retrieval, Data Structures & Algorithms*, edited by William B. Frakes, Software Engineering Guild, and Ricardo Baeza–Yates, University of Chile, 1992.

(List continued on next page.)

*Primary Examiner*—Wayne Amsbury
*Assistant Examiner*—Thuy Pardo
*Attorney, Agent, or Firm*—Marger Johnson & McCollom, P.C.

[57] ABSTRACT

An Intelligent Query Engine (IQE) system automatically develops multiple information spaces in which different types of real-world objects (e.g., documents, users, products) can be represented. Machine learning techniques are used to facilitate automated emergence of information spaces in which objects are represented as vectors of real numbers. The system then delivers information to users based upon similarity measures applied to the representation of the objects in these information spaces. The system simultaneously classifies documents, users, products, and other objects. Documents are managed by collators that act as classifiers of overlapping portions of the database of documents. Collators evolve to meet the demands for information delivery expressed by user feedback. Liaisons act on the behalf of users to elicit information from the population of collators. This information is then presented to users upon logging into the system via Internet or another communication channel. Mites handle incoming documents from multiple information sources (e.g., in-house editorial staff, third-party news feeds, large databases, World Wide Web spiders) and feed documents to those collators which provide a good fit for the new documents.

48 Claims, 23 Drawing Sheets

OTHER PUBLICATIONS

*Machine Learning for Information Retrieval: Neural Networks, Symbolic Learning, and Genetic Algorithms,* written by Hsinchun Chen, *Journal of the American Society for Information Science,* 46(3):194–216, 1995.

*Context Vector–Based Text Retrieval,* written by William R. Caid and Joel L. Carleton, Aug. 1997.

*Docuverse: A Context Vector–Based Approach to Graphical Representation of Information Content,* written by Robert V. Sasseen and William R. Caid, Aug. 1997.

*CONVECTIS: A Context Vector–Based On–Line Indexing System,* written by Robert V. Sasseen, Joel L. Carleton and William R. Caid, Aug. 1997.

153
COLLATOR GOODNESS SPACE

153A
GOODNESS TABLE

| DOC ID | GOODNESS SCORE |
|---|---|
| 1 | SUMMARY(DOCUMENT TABLE ROW 1) |
| ... | ... |
| N | ... |

FIG.11

COLLATOR C=1
COLLATOR GOODNESS TABLE

| DOC ID | GOODNESS SCORE | |
|---|---|---|
| 1 | 0.5 | 153A |
| 2 | 0.7 | |
| 3 | −0.6 | |
| 4 | −0.1 | |

USER K=1
FEEDBACK EVENT TABLE

| DOC ID | USER RATING | |
|---|---|---|
| 1 | 0 | 226 |
| 2 | −0.5 | |
| 3 | −0.5 | |
| 4 | 0.1 | |

USER K=2
FEEDBACK EVENT TABLE

| DOC ID | USER RATING | |
|---|---|---|
| 1 | 0.5 | 226 |
| 2 | 0.5 | |
| 3 | 0 | |
| 4 | −0.5 | |

FIG.12B

RECOMMENDATIONS LIST

| QUERY GOODNESS: 0...+1.0 | |
|---|---|
| IDENTIFIER | RELEVANCE SCORE |
| 1 | 0...+1.0 |
| 2 | 0...+1.0 |
| ... | ... |

RECOMMENDATIONS LIST FROM COLLATOR 1

| QUERY GOODNESS: 0.8 | |
|---|---|
| IDENTIFIER | RELEVANCE SCORE |
| 1 | 0.9 |
| 2 | 0.85 |
| 3 | 0.7 |
| 4 | 0.6 |

340

RECOMMENDATIONS LIST FROM COLLATOR 2

| QUERY GOODNESS: 0.5 | |
|---|---|
| IDENTIFIER | RELEVANCE SCORE |
| 3 | 0.8 |
| 1 | 0.7 |
| 5 | 0.65 |
| 6 | 0.6 |

342

MERGED RECOMMENDATIONS LIST

| IDENTIFIER | RELEVANCE SCORE |
|---|---|
| 2 | 0.68 |
| 1 | 0.535 |
| 3 | 0.48 |
| 4 | 0.48 |
| 5 | 0.325 |
| 6 | 0.30 |

INTELLIGENT QUERY SYSTEM FOR AUTOMATICALLY INDEXING INFORMATION IN A DATABASE AND AUTOMATICALLY CATEGORIZING USERS

BACKGROUND OF THE INVENTION

This invention relates to accessing information and categorizing users and more particularly to an adaptive and scalable indexing scheme.

Document retrieval often involves accessing a large information space. This information space is characterized by many dimensions. Each document occupies a single point in this information space. However, the organization of documents in the space is complex. This complexity is a product of the dimensionality of the space. Documents share properties, and thus share the coordinates of some subset of dimensions, but differ with respect to other properties. Because of this, the entire information space is only sparsely populated with documents. Sparse distribution of documents in the information space makes intelligent searching of the space difficult. The relationships between two documents are only poorly described in the space since the documents typically differ in more ways than they are the same. Across a group of documents, there is minimal structure to organize a search for relevant documents.

Artificial neural networks (ANNs) are used to generate statistical relationships among the input and output elements, and do so through self-organization or, at least, through an automated abstraction or learning process. Several efforts have employed ANNs to a limited extent for information retrieval. The ANN contains a set of constraints which, when given some input pattern coding a query, directs the user to similar documents or pieces of information. The initial set of constraints is generally determined by the application of a training corpus set of records to the ANN. These constraints are incrementally modifiable, allowing the ANN to adapt to user feedback. However, although several research efforts have demonstrated the utility of adaptive information retrieval with ANNs, scalable implementations have not appeared. For reviews, see Doszkocs, 1990, and Chen, 1995, incorporated herein by reference.

On the other hand, some large-scale systems which lack mechanisms for adaptation have successfully exploited the statistical relationships among documents and terms found in those documents, for storage and retrieval of documents and other information items. For example, U.S. Pat. No. 5,619,709 to Caid, et. al., describes generation of context vectors that represent conceptual relationships among information items. The context vectors in Caid, et. al. are developed based on word proximity in a static training corpus. The context vectors do not adapt to user profile information, new information sources, or user feedback regarding the relevancy of documents retrieved by the system. Thus, the system in Caid, et. al. does not evolve over time to provide more relevant document retrieval.

Accordingly, a need remains for a scalable information representation and indexing scheme that adapts document retrieval to continuously changing user feedback, user profiles, and new sources of information.

SUMMARY OF THE INVENTION

An Intelligent Query Engine (IQE) system automatically develops multiple information spaces in which different types of real-world objects (e.g., documents, users, products) can be represented. The system then delivers information to users based upon similarity measures applied to the representations of the objects in these information spaces. The system simultaneously classifies documents, users, products, and other objects. Any object which can be related to or represented by a document (a chunk of text) can participate in the information spaces and can become the target of similarity metrics applied to the spaces.

The system automatically indexes large quantities of documents in a database. The indices are managed by persistent objects known as collators. Collators are resident in the system and act as classifiers of overlapping portions of the database of documents. Collators evolve to meet the demands for information delivery expressed by user feedback. Collators evolve under selective pressure to cover as much of the database as possible under the constraints of finite and particular computing resources. Other objects, known as liaisons, act on the behalf of users to elicit information from the population of collators. This information is then presented to users upon logging into the system via Internet or another communication channel. Object-oriented programming facilitates the implementation of a highly distributed system of asynchronously communicating liaisons and collators.

Collators propagate in the system via success at attracting and delivering relevant information to users. Thus, not only are there multiple information spaces, but these are competing ways of representing the universe of information elements. An evolutionary model is applied to the system to optimize the allocation of resources to collators and to promote specialization among the population of collators. That is, the evolutionary framework makes the system scalable by establishing the criteria that determine which documents are good documents and which documents can be ignored or removed. The evolutionary framework also makes the system more effective at locating the most relevant documents by refining the semantic structure generated through retention of good documents.

Objects called mites handle incoming documents from multiple information sources (e.g., in-house editorial staff, third-party news feeds, large databases, World Wide Web spiders) and feed documents to those collators which provide a good fit for the new documents. Mites recycle documents from collators that are removed from the system due to inability to satisfy the information needs of users. Mites also archive documents from the database which fail to fit well with any collators.

Liaisons act on behalf of the users to retrieve information via the views of the database provided by collators. These views provide interpretations of all of the participating objects: documents, users represented by the documents they have read and rated as relevant, products represented by documents, etc. The system thus provides a mechanism for delivering relevant documents, putting users in touch with other users who have similar reading interests, and recommending relevant products to users.

Machine learning techniques are used to facilitate automated emergence of useful mathematical spaces in which information elements are represented as vectors of real numbers. A first machine learning technique automatically generates a set of axes that characterize the central semantic dimensions of a collator's set of documents. The procedure begins with the set of documents coded as vectors of term frequencies in an information space spanned by a dictionary of all terms in the set. The collator then finds a reduced dimensionality space spanned by a set of concepts which are central to a significant portion of the set of documents. The original information space, spanned by the entire dictionary, is mapped into a low-dimensional space spanned by a set of central concepts. The new low-dimensional space represents a particular view of the portion of the database represented by the collator's set of documents. The database portion is not chosen in advance, but evolves contemporaneously with the vector space structure which emerges.

The collators operate as classifiers in an evolutionary framework. The particular vector spaces developed by collators, as described above, are subject to two kinds of selective pressure. First, the vector space must provide a good fit to many documents. Second, the vector space must provide delivery of relevant documents to many users. The first kind of fitness is measured directly from the ability of the reduced dimensionality vector space to code documents made available by mites. The second kind of fitness is derived from user feedback. Explicit and implicit user feedback is used to identify successful collators. Fit collators propagate their vector spaces into the next generation via reproduction while unfit collators are eliminated.

The system utilizes knowledge-based artificial intelligence to facilitate classification of users, documents, and products. For example, in the preferred embodiment, specific medical and social knowledge is exploited to assist with automated query generation by liaisons. This knowledge is collected from medical and other domain experts and coded into the system as a knowledge model composed of concepts and relations between concepts. These knowledge items are instantiated as profile facts about the user, which are entered and maintained by the user. Liaisons query collators on behalf of users; liaisons also query users directly in order to build better profiles. Both collator querying and user querying are facilitated by the knowledge model.

The foregoing and other objects, features, and advantages of the invention will become more readily apparent from the following detailed description of a preferred embodiment of the invention which proceeds with reference to the accompanying drawings.

BRIEF DESCRIPTION OF THE DRAWINGS

FIG. 11 is a detailed block diagram of a goodness space of the collator shown in FIG. 9.

FIG. 12B is a sample collator goodness table and sample user feedback event tables showing how collator evolution is determined in the intelligent query engine system shown in FIG. 8.

FIG. 16 shows a recommendations list used to facilitate queries in FIG. 14.

FIG. 17 shows a sample merged recommendations list created from two recommendations lists shown in FIG. 16.

FIG. 21 is a step diagram showing the process of a user query.

FIG. 22 shows a feedback event table used to facilitate user queries in FIG. 21.

DETAILED DESCRIPTION

Vector Spaces

STATIC VECTOR SPACES

Figure 1:
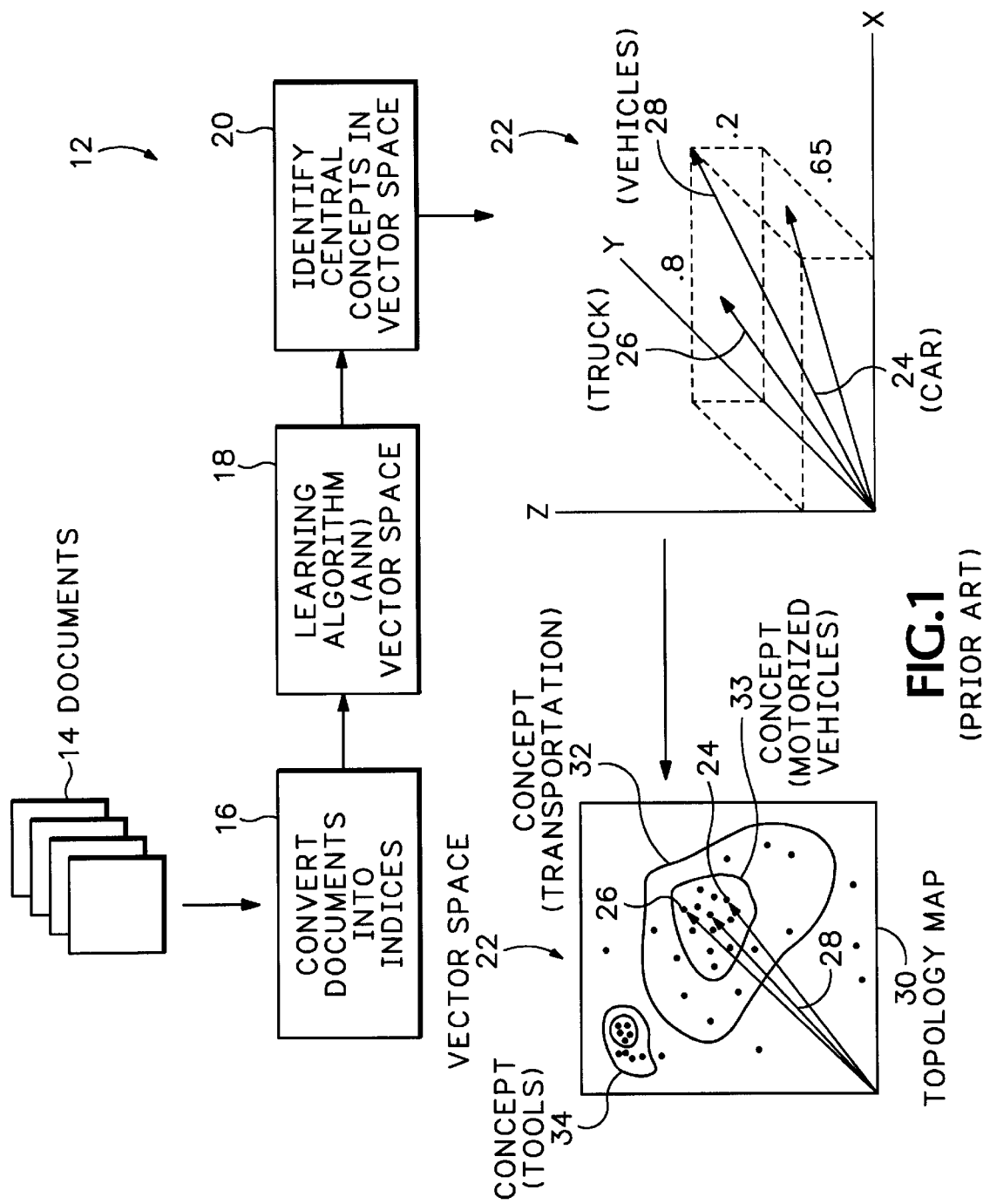
FIG. 1 is a schematic diagram of a prior art vector space information and retrieval system.

Referring to FIG. 1, a prior art document retrieval system 12 comprises an information space represented by documents 14. The documents are converted into multiple indices in block 16. The document indices each include a document ID, a list of the different words in the document, and the location of the words in the document. A learning algorithm utilizes an artificial neural network (ANN) in block 18 to generate statistical relationships among the document indices. The vector space generated in block 18 is then subjected in block 20 to a clustering process which identifies a set of concepts central to the documents 14.

Each document 14 occupies a single point in the vector space 22. For example, a first document regarding cars is represented by a vector 24, and a second document relating to trucks is represented by a vector 26. The similarity between the two documents is determined by taking the dot product of the two vectors 24 and 26. The larger the dot product value, the more similarity between the two vectors 24 and 26. All the vectors clustered around it, including vectors 24 and 26, may represent a common concept. For example, the vector 28 represents a central concept "vehicles" related to all documents clustered around vectors 24 and 26. A document vector is represented by an ordered set of real numbers, one number for each axis in the vector space. For example, the vector 28 is [0.8, 0.65, 0.2].

A topology map 30 provides an alternative way to represent the vector space 22. In this type of map, elevation represents document density in a vector space. In topology map 30, the vector space is two-dimensional. Documents clustered within different regions of the map represent different concepts. For example, a first cluster of documents within region 32 represents a broad concept relating to "transportation." A second, more densely populated region 33 within region 32 represents a narrower concept relating to "motorized vehicles." A centroid vector 28 of region 33 represents the concept of "vehicles." A third region 34 is located in a different portion of the topology map 22 and represents a different concept related to "tools."

If two documents differ in more ways than they are the same, the many semantic relationships between the two documents will be poorly described in the vector space 22. There may not be a summary (centroid) vector that effectively represents important concepts shared by the documents. Document vectors can also be so densely clustered that different concepts cannot be differentiated in the vector space 22. Furthermore, only a small area of the vector space 22 may relate to documents of interest to the user. The vector space 22 is static which means that organizing structure of the topology map 30 remains the same regardless of the availability of new documents or the relevancy of documents supplied to users. For these reasons, intelligent searching of a vector space for documents of interest to users may not be possible.

EVOLVING VECTOR SPACES

Figure 2:
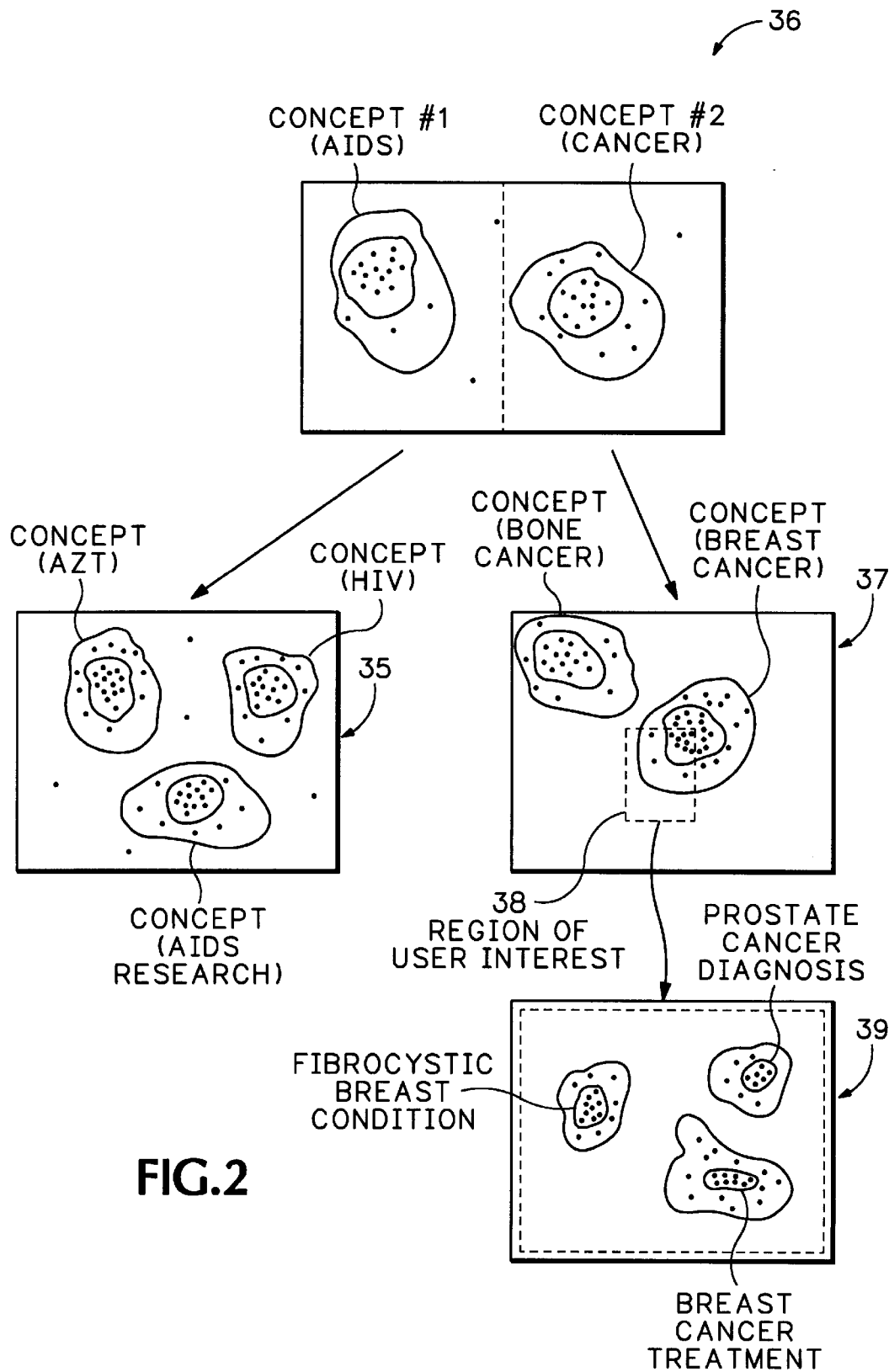
FIG. 2 is a schematic diagram showing evolution of a vector space according to the invention.

Referring to FIG. 2, a collator produces a vector space 36 by applying a statistical learning algorithm and a clustering process to a corpus of documents in a manner similar to that shown in FIG. 1. However, over one or more generations of collator and vector space evolution, the collator vector space 36 evolves into vector space 35 or vector space 37 based upon user feedback, changes in user profiles, and new sources of information (i.e., new documents) according to the invention. Vector spaces 35 and 37 are maintained by subsequent individual collators in the collator population. Vector spaces 35 and 37 include a subset of the original documents in vector space 36 plus new documents added over time. For example, in response to a need demonstrated by user feedback to better represent the concepts "AIDS" and "cancer," an individual collator in the collator population will specialize to better cover those concepts, resulting in emergence of vector space 35 or 37, respectively. Further user interest 38 demonstrated regarding part of the concept "breast cancer" will cause further specialization of an individual collator in the collator population, resulting in emergence of vector space 39.

As a result of evolution, concepts that are only generally described in early-generation vector space 36 are more precisely described in later-generation vector spaces 35, 37, and 39. For example, documents in vector space 36 cluster around a first general concept regarding "AIDS" and a second general concept regarding "cancer." However, vector space 36 further refines the representations of those concepts when subjected to user feedback. User feedback takes the form of users marking relevant documents by reading the documents, rating the documents, or saving the documents in a user database. As a result of collators evolving under selective pressure provided by user feedback, documents in vector space 35 are tightly clustered around the emergent subconcepts of "AZT," "HIV," and "AIDS research," while documents in vector space 37 are focused on "bone cancer" and "breast cancer" and documents in vector space 39 are further focused on "fibrocystic breast condition," "prostate cancer diagnosis," and "breast cancer treatment." These new vector spaces 35, 37, and 39 have the advantage of better identifying subconcepts of particular interest to users. Thus, queries referencing the newly discovered concepts in vector space 35, 37, and 39 are responded to with more relevant document retrieval recommendations than if only vector space 36 was available.

Figure 3:
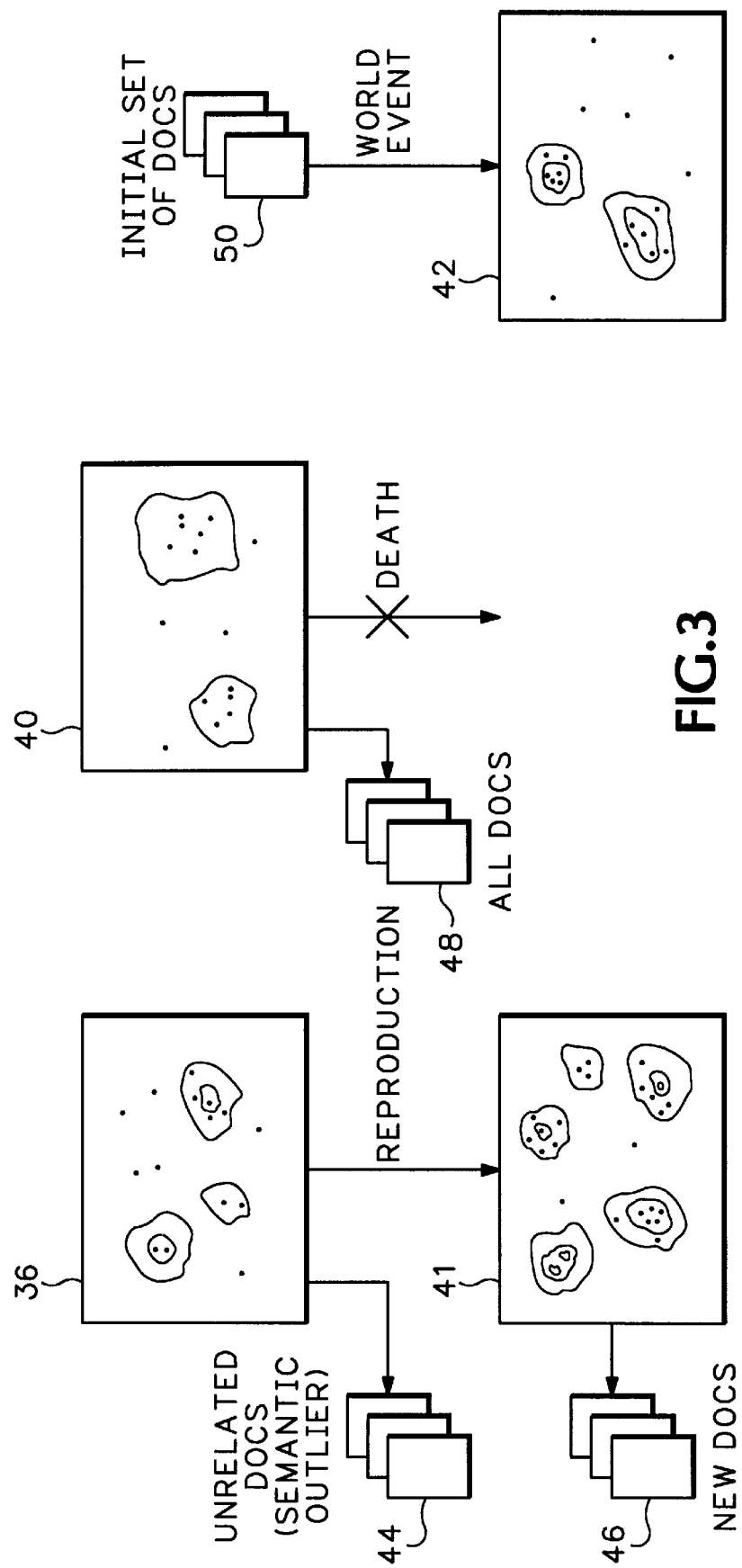
FIG. 3 is a schematic diagram showing conditions for vector space evolution according to the invention.

FIG. 3 shows several different conditions that affect evolution of multiple vector spaces utilized for the categorization and retrieval of documents and users: reproduction, death, and world events. Reproduction occurs when a vector space 36 evolves into a vector space 41 that specializes in specific, popular concepts. Death occurs when a vector space 40 is unsuccessful as a result of failing to specialize or specializing in concepts unpopular according to user feedback. World events are the only method (aside from reproduction) by which a new vector space 42 comes into existence.

Reproduction replaces the original vector space 36 with a descendant vector space 41. During reproduction, vector space 36 discards documents 44 that have little relation to the primary concepts in vector space 36. Discarded documents are called "semantic outliers" in the particular structure of vector space 36. All remaining documents are passed on to the descendant vector space 41, which applies its own learning algorithm and clustering process to the corpus of inherited documents in a manner similar to that shown in FIG. 1. As a result, vector space 41 is better focused on the concepts of primary interest to users. Because vector space 41 has increased conceptual resolution over the original vector space 36, queries of vector space 41 are responded to with more relevant document recommendations. Vector space 41 also grows as a result of the addition of new documents 46, creating new areas of conceptual specialization. New documents 46 either come from a new information source or were discarded by another vector space.

Death occurs when a vector space 40 fails to provide documents of interest to users. At death, all documents 48 are released by the vector space 40 for recycling to other vector spaces. Death of vector space 40 is necessary to free up system resources and make way for other vector spaces that may better categorize and retrieve documents.

World events are global system-wide events affecting vector spaces (and other parts of the system). A particular world event of interest is one that causes a new vector space 42 to come into existence due to the introduction of new computing resources. The initial set of documents 50 provided to a newly created vector space 42 is, in the preferred embodiment, a random selection of all documents in the system. As a result of this seeding process, the new vector space 42 has an opportunity to discover new concepts not found by any existing vector spaces or to better specialize in those concepts already present in other vector spaces. Another possible reason to create a new vector space 42 would be if a new information source was judged to be substantially different from all existing documents as a result of some common feature of the new documents, such as being in a different language than English. A new vector space 42 would be required to successfully respond to queries related to the new document set.

The evolution of vector spaces described in FIGS. 2 and 3 according to the invention results in improved efficiency and performance at categorizing and retrieving documents. The vector spaces adapt to user feedback, changing user profiles, and new sources of information. The size and number of vector spaces also scales to accommodate new sources of information to meet the needs of users.

Intelligent Query System

Figure 4:
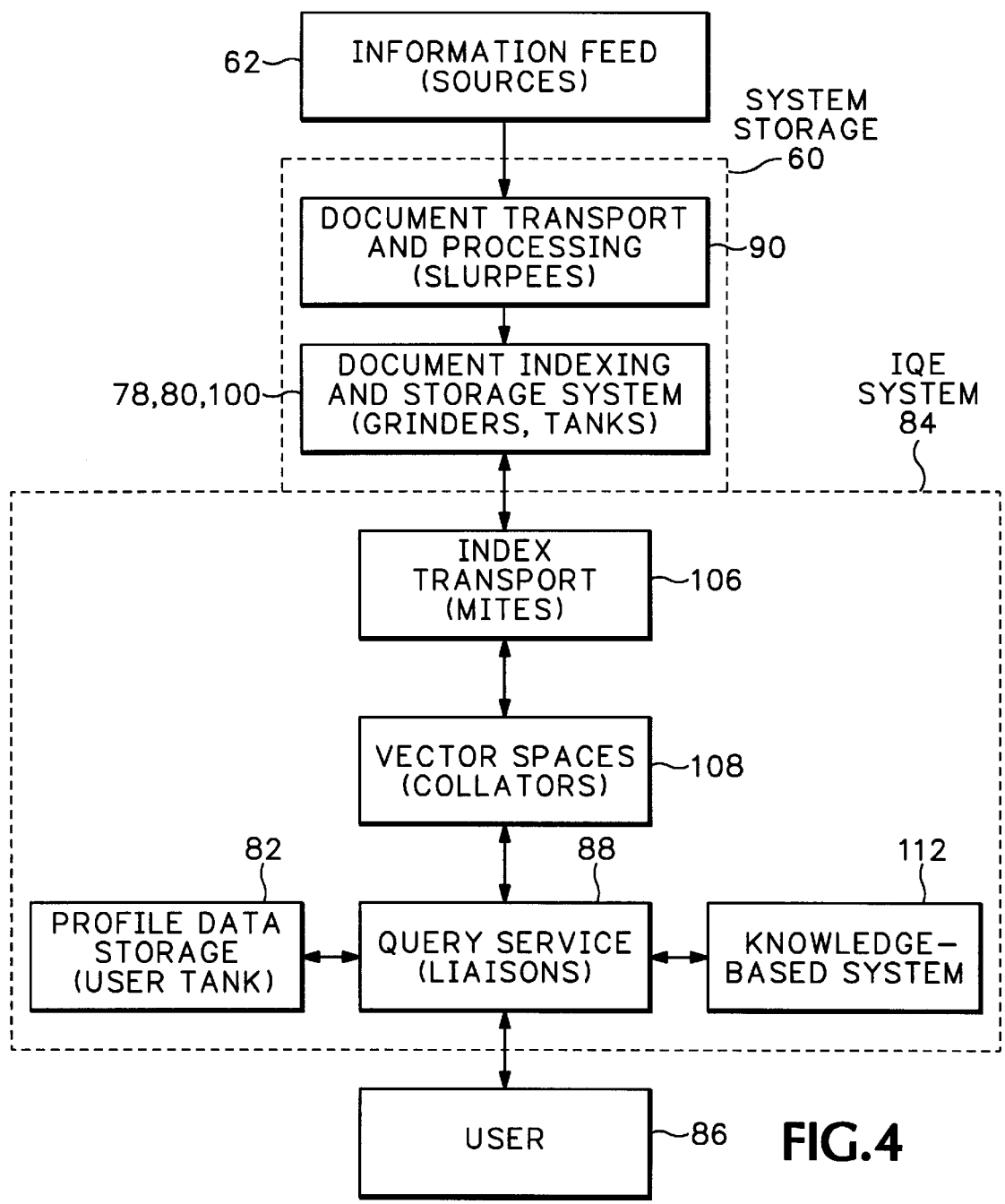
FIG. 4 is a block diagram showing a storage system and an intelligent query engine system according to the invention.

FIG. 4 is a schematic diagram of a storage system 60 and an Intelligent Query Engine (IQE) system 84. The IQE system 84 creates and manages the vector spaces described in FIGS. 1, 2, and 3, while the storage system 60 transports, processes, indexes, and stores documents from information sources 62 comprising different documents of interest. The storage system 60 and IFQE system 84 in one embodiment are located on a computer system and maintain documents in the computer system memory.

The storage system 60 manages information from a variety of sources 62. Sources 62 have many possible types: static or dynamic; text, audio, or video; freely available or with contractual restrictions on usage; in a variety of languages. In the preferred embodiment, sources 62 comprise English text documents from news feeds such as Reuters Medical News and specialized medical journalists, databases such as Medline and MDX Health Digest, journals such as the New England Journal of Medicine, and documents from medical Web sites gathered by World Wide Web spiders. Regardless of the particular information source 62, if the information can be related to or represented by a bounded chunk of text (i.e., a document), it can be utilized in the IQE system 84.

A document transport and processing system comprises slurpees 90 that filter unwanted information and convert documents to a standard format. Unwanted information includes indecipherable bit patterns and invalid words, duplicate documents, and information from irrelevant domains. For example, geological data are blocked from entering a storage system 60 concerned primarily with medical information. Slurpees 90 also convert documents to a canonical source-independent format for use by the document indexing and storage system 100.

The document indexing and storage system stores the original documents in an asset tank 78. To facilitate retrieval of documents from the asset tank 78, grinders 100 code (index) each document in terms of features. The document indices are stored in an index tank 80 which contains indexes and links to the documents in the asset tank 78. The asset tank 78 and index tank 80 are compound, complex data storage mechanisms consisting of a collection of object or relational database management systems (DBMS). Database management systems are known to those skilled in the art and are therefore not described in further detail.

Of particular interest is the IQE system 84 that converts the indices in index tank 80 into multiple vector spaces that provide intelligent searching and categorization of documents and users. Mites 106 transport document indices from index tank 80 to multiple collators 108. The IQE system 84 also contains a query service via liaisons 88. The liaisons 88 query the collators 108 for document recommendations. Queries include natural language inputs produced by a user 86 or prompts generated on behalf of the user 86 by the liaison 88. Feedback information from user 86 regarding the relevancy of the retrieved documents, along with documents from new sources 62, are used by the IQE system 84 to improve queries and evolve collators 108. Thus, the IQE system 84 becomes better over time at recommending and retrieving relevant documents for user 86. The IQE system 84 constantly runs "behind the scenes," performing tasks initiated by a liaison 88 on behalf of the associated user 86, even when user 86 is not logged into the IQE system 84.

A user tank 82 stores profile data and reading preferences for user 86. For example, user tank 82 contains user responses to profiling questions such as age, weight, medical conditions, etc. and contains the identifiers for documents from asset tank 78 that user 86 has recently read or saved. A knowledge-based system 112 includes a domain-specific knowledge model and is used by liaison 88 to develop queries for user 86.

Storage System

Figure 5:
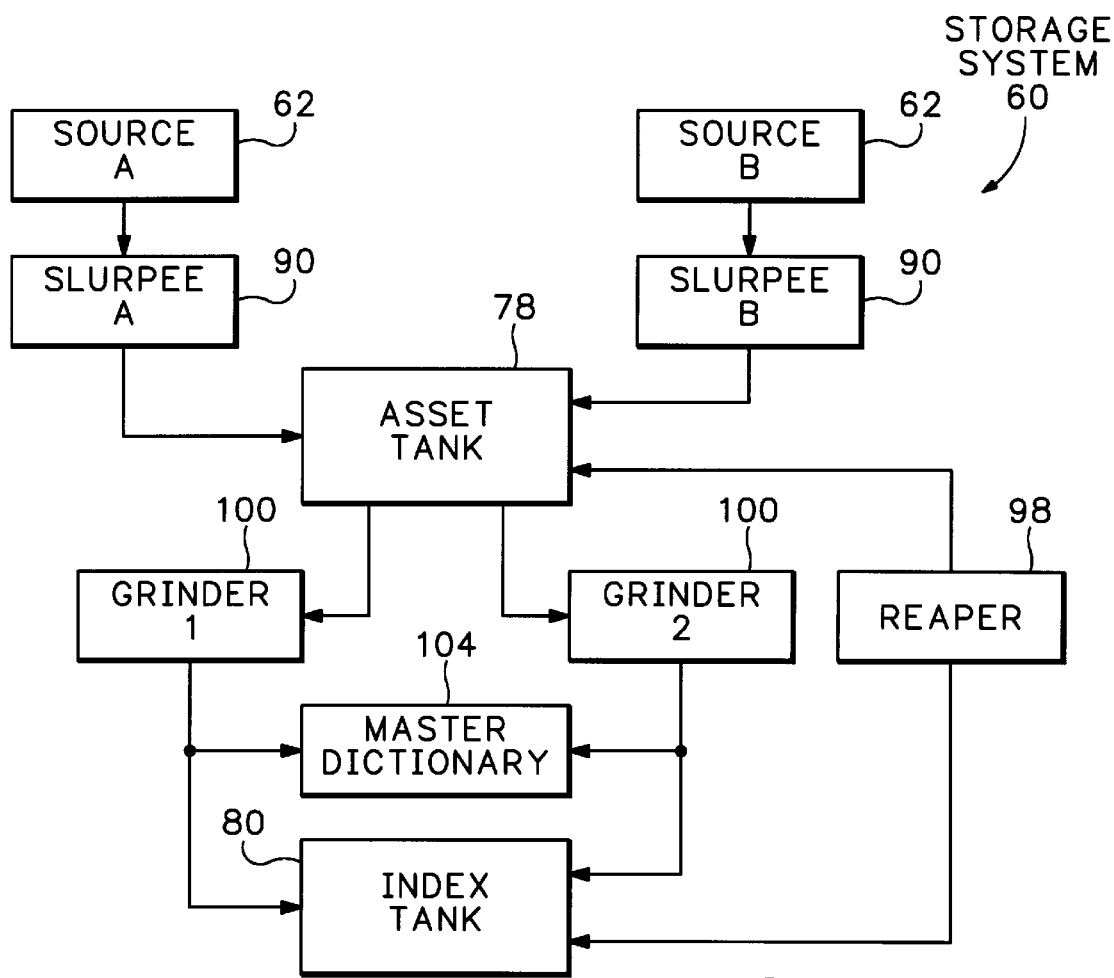
FIG. 5 is a detailed block diagram of the storage system shown in FIG. 4.

FIG. 5 is a detailed block diagram of the storage system 60 shown in FIG. 4 and includes multiple slurpees 90 that transport documents from multiple sources 62. Slurpees 90 filter unwanted information and convert documents to a standard format before storing the documents in asset tank 78. Each slurpee 90 corresponds to a particular source 62. For example, slurpee A is associated with source A and slurpee B is associated with source B.

Grinders 100 convert documents in asset tank 78 into indices. In one embodiment, each index is a reduced word list that identifies the number of times and where each indexed word occurs in the associated document. All indices are stored in index tank 80. All words identified in each index are accumulated in the master dictionary 104. Any words identified in a document that are not currently in master dictionary 104 are incrementally added into master dictionary 104 by one of the grinders 100.

A reaper 98 removes certain documents and indices which must be periodically deleted. For example, documents from certain news sources can only be held locally in asset tank 78 for 30 days due to contract limitations. The reaper 98 tracks how long information resides in the tanks and after the predetermined time period, deletes that information from the asset tank 78 and index tank 80.

SLURPEES

Figure 6:
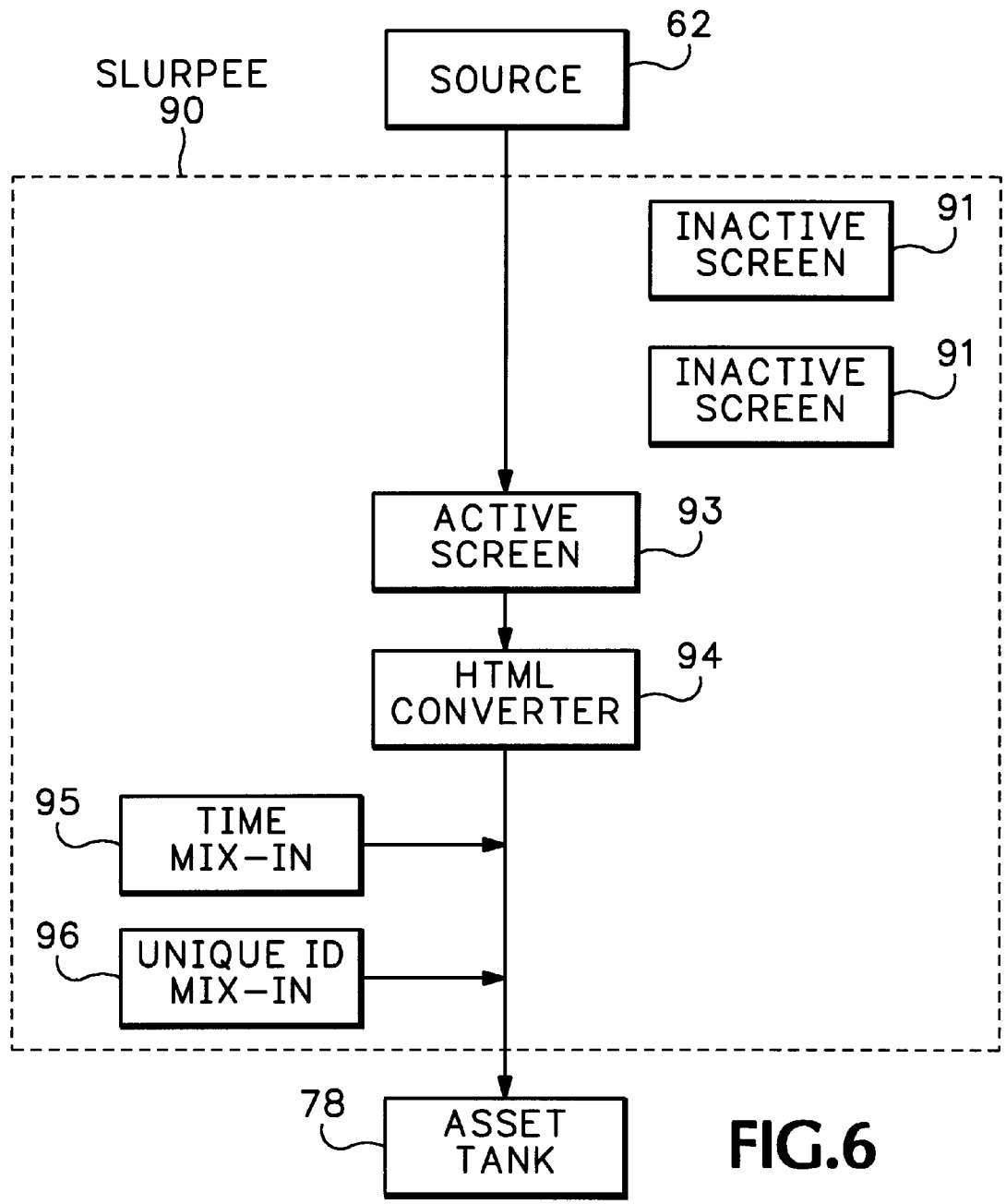
FIG. 6 is a detailed block diagram of a slurpee used in the storage system shown in FIG. 5.

Referring to FIG. 6, each slurpee 90 opens necessary connections to one of the sources 62 and then filters the incoming information via screens 91 and 93 which remove certain characteristics from the documents in source 62. For example, the slurpee 90 initiates a periodic FTP connection to a source 62 such as a health publication site, retrieving an ASCII file from source 62 that has multiple, concatenated medical stories. Then, screen 93 removes documents shorter than three lines, embedded binaries, or duplicate documents. Screens may be inactive 91 or active 93 in slurpee 90 according to varying filtering requirements for different sources 62.

The slurpee 90 generally outputs documents in the same protocol and format in which the documents are received. However, slurpee 90 can also be used to convert documents into a standard protocol or format by utilizing a converter 94. For example, a network communication protocol such as Hypertext Transfer Protocol (HTTP) may contain unnecessary information, so a slurpee 90 accessing source 62 via HTTP will use a converter 94 to strip extraneous header information before storing the documents in asset tank 78 as a series of Hypertext Markup Language (HTML) documents. Slurpees 90 also utilize mix-ins, such as time stamp mix-in 95 and unique identifier mix-in 96 to further process each document before it is inserted into asset tank 78.

GRINDERS

Figure 7:
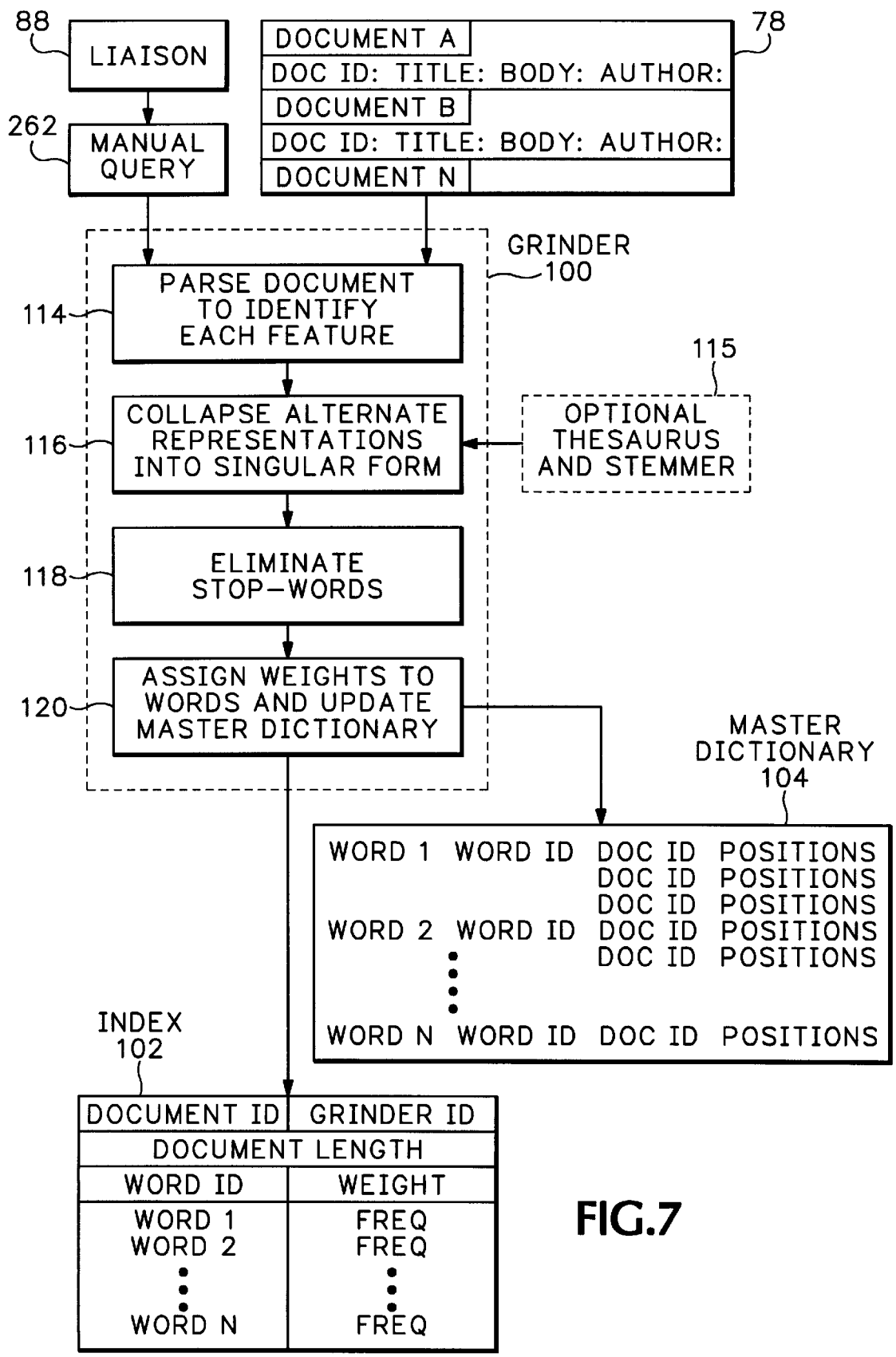
FIG. 7 is a detailed block diagram of a grinder used in the storage system shown in FIG. 5.

Referring to FIG. 7, grinders 100 produce indexes from the documents in asset tank 78 and usercontributed manual queries 262 from liaisons 88. Generally, all the documents in asset tank 78 are in a standard format, so grinders 100 operate independently of any differences in the formats and protocols of the original documents from the different sources 62 (FIG. 5). Different types of grinders 100 employ different techniques for coding (indexing) documents.

The grinder 100 performs some initial processing of each document to prepare for indexing. In block 114, the grinder 100 parses the document to identify features in the document. A feature is any sequence of characters. In the preferred embodiment, features are words separated by white space. In block 116, the grinder 100 stems inflected word forms and looks up word equivalents via an optional thesaurus and word stemmer 115 to collapse alternative representations of words into singular forms. Block 118 eliminates "stop words" (e.g., "an," "the") which appear frequently in the natural language of the document but do not carry significant semantic content. Once these initial processing steps are complete in step 120, grinder 100 generates document indices 102 and updates the master dictionary 104.

The grinder 100 generates an index 102 for each document taken from the asset tank 78 or provided by liaisons 88. An index 102 includes a document ID, grinder ID, document length, and a two-column grinder coding table listing features and the weighting for the feature. Different types of grinders 100 employ different weighting schemes. In the preferred embodiment, words are assigned weights proportional to their frequency in a document because words that occur frequently in a document may be significant markers of semantic content and will facilitate matching documents to queries by liaisons 88. Weightings may also be assigned according to "meta-features" which adhere in a document's structure, such as a document's author, source, judged reading level, or the location of words in particular places or sections of a document. The grinder 100 also updates the master dictionary 104 that contains all words for all documents in asset tank 78. The master dictionary 104 includes each word, a unique word ID for the word, document IDs for documents that contain the word, and positions of the word in the identified documents.

IQE System

Figure 8:
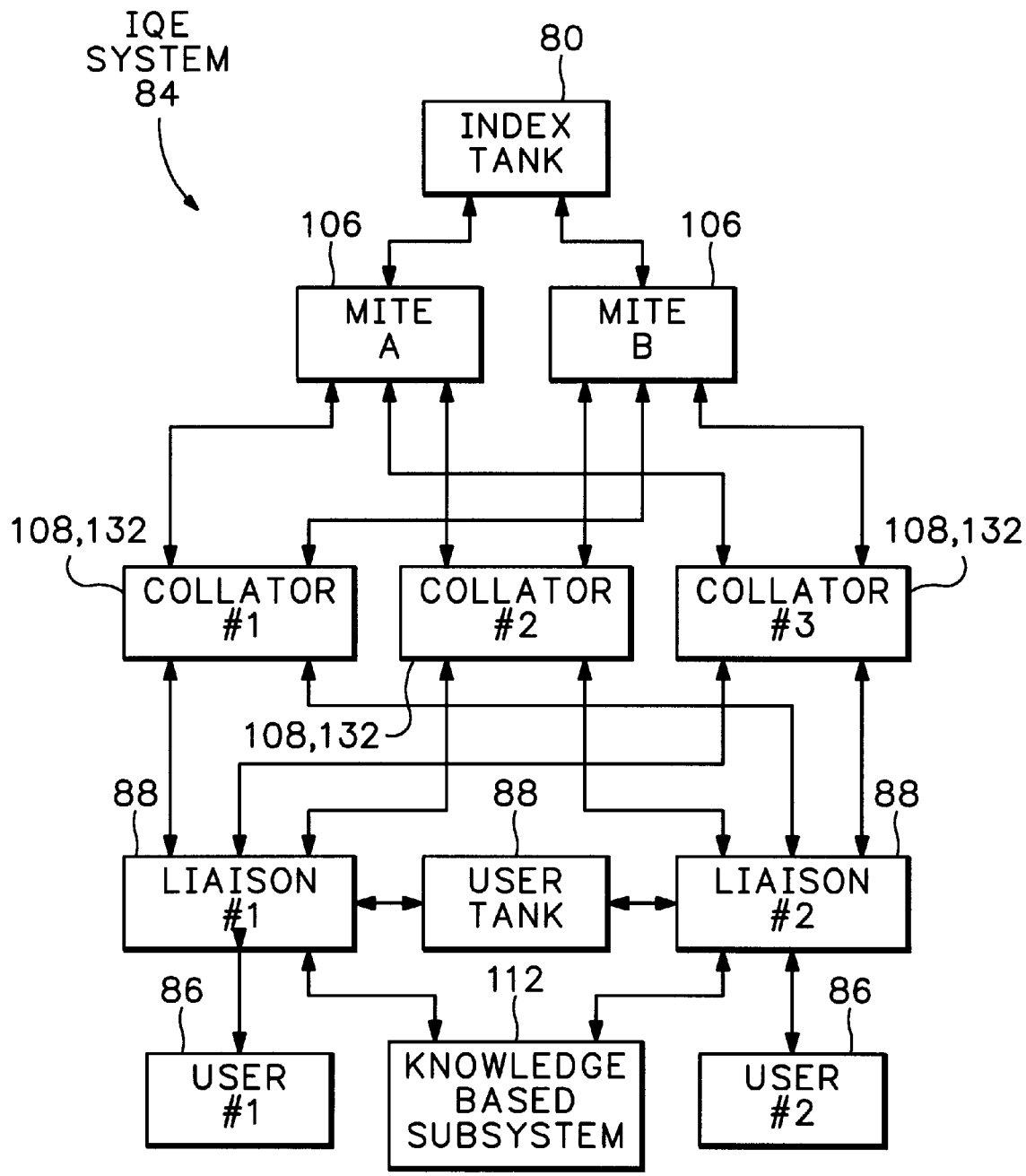
FIG. 8 is a detailed block diagram of the intelligent query engine system shown in FIG. 4.

FIG. 8 is a detailed block diagram of the intelligent query engine (IQE) system 84. When a user 86 becomes a participant in the IQE system 84, a liaison 88 is automatically created on the user's behalf; the IQE system 84 includes one liaison 88 for each user 86. If a user 86 permanently leaves the IQE system 84, the liaison 88 corresponding to that user 86 is destroyed. In one embodiment, an IQE system 84 focused on medical information can be accessed through the Internet Web site at http://www.shn.net/.

In the IQE system 84, the user 86 interacts with the liaison through a graphical user interface (not shown) that provides a series of screens that interview the user 86 to gather profile data about the user 86. The structure of this interview is determined by a knowledge-based system 112 which utilizes a knowledge model to code facts about the user 86 based on the user's responses to interview questions. For example, the liaison 88 prompts the user 86 for age, gender, and medical history. Thus, the liaison 88 builds and maintains a model of the user 86 that includes user profile data as well as a history of the user's interaction with the IQE system 84. This information is stored in the user tank 82.

The IQE system 84 also includes many collators 108 and mites 106. The number of mites 106 is related to the number of different sources 62 (FIGS. 4, 5, and 6); the number of collators is not directly related to the number of users 86, mites 106, or sources 62 but is determined by available system resources. Each collator 108 classifies documents and responds to queries by liaisons 88 for document recommendations. The documents delivered by the collators 108 to the liaison 88 are then presented by the liaison 88 to the user 86. Each collator 108 maintains internal classifications of a particular set of documents which is a subset of index tank 80 and which constitutes the collator's representational spaces.

Figure 13:
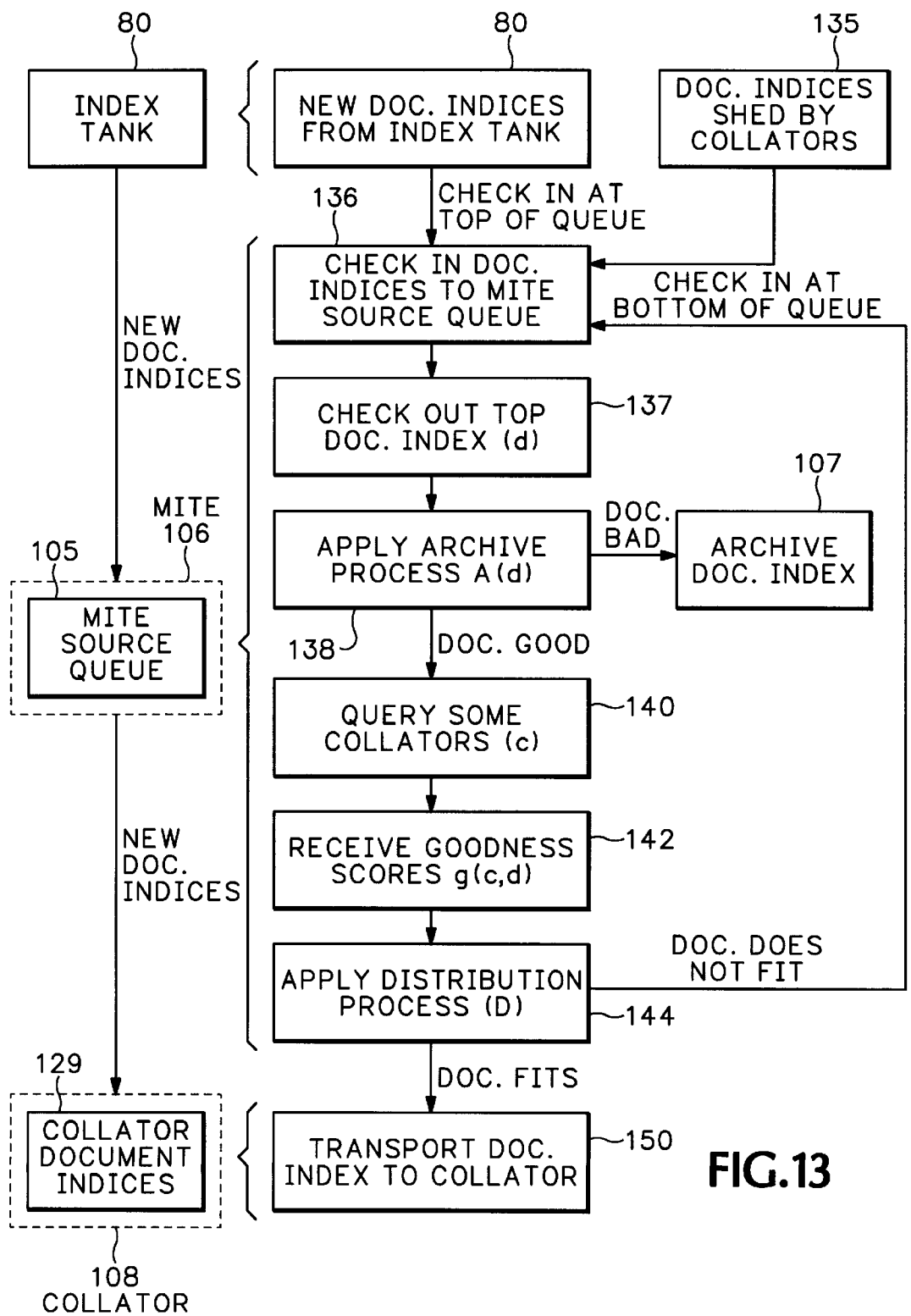
FIG. 13 is a step diagram showing operation of a mite used in the intelligent query engine system shown in FIG. 8.

Mites 106 continuously distribute incoming and recycled documents to multiple collators 108 as determined by the goodness of fit between the new documents and those already contained in the collators' vector spaces 132. Mites 106 check documents in and out of index tank 80 via a source queue 105 (FIG. 13). Unproductive documents that have little relationship to any other documents in any collator's vector space 132 are placed in an archive 107 (FIG. 13) and thereby removed from active circulation in the IQE system 84.

COLLATORS

A collator 108 is an object which maintains representations of real-world objects (e.g., documents, users, products) and makes recommendations regarding those objects in response to queries from liaisons 88 on behalf of users 86. For example, a collator maintains a corpus of documents which are compared against queries by liaisons 88 to identify documents of interest to users 86. Multiple collators 108 exist in an evolution-like framework where feedback from users 86 contributes to fitness criteria for weeding out poor-performing collators. The dual requirements that all documents be accommodated by a plurality of collators 108 and that these documents be found useful to a plurality of users 86 provides an evolutionary tendency for collators 108 to specialize in some conceptual domain.

Collator Index Space

Figure 9:
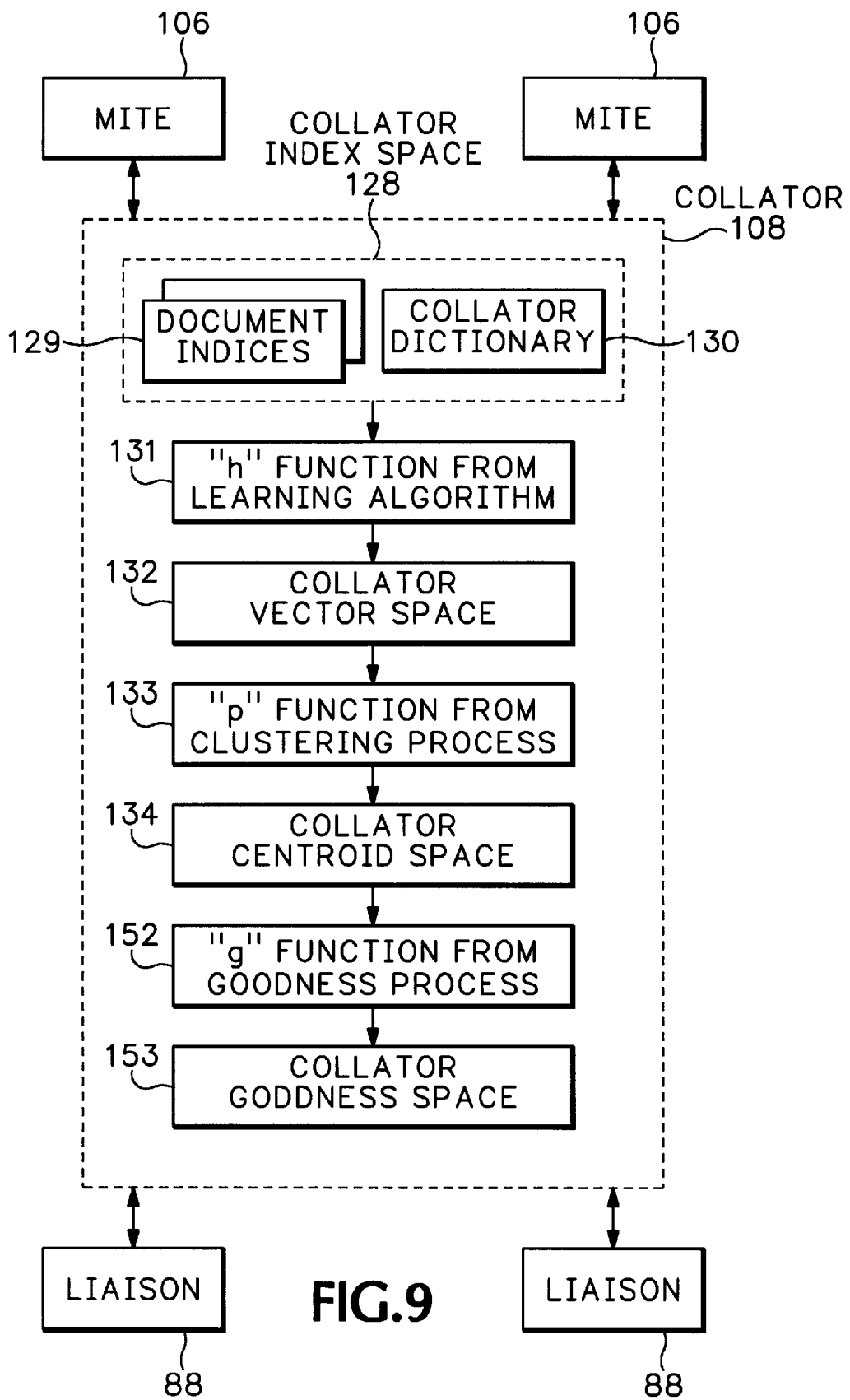
FIG. 9 is a detailed diagram of a collator used in the intelligent query engine system shown in FIG. 8.

FIG. 9 is a detailed diagram of a collator 108. Each collator 108 includes a different corpus of document indices 129 which are provided to the collator 108 via mites 106. A collator's document indices 129 are a subset of document indices 102 (FIG. 7) from index tank 80 (FIG. 8). A collator 108 also includes a collator dictionary 130 that contains all words in that collator's document indices 129. The collator dictionary 130 is similar in structure to the master dictionary 104 (see FIG. 7). Both the collator dictionary 130 and the corpus of document indices 129 exist in the collator index space 128, which is the highest dimensionality representational space managed by each collator 108. In the research literature on information retrieval, what herein is called "collator index space" is comparable to what is often referred to as a "vector space" and is the foundation for the "vector space model" of information retrieval described in Automatic Text Processing, pp. 313–366 by G. Salton, 1989, Reading, Mass.: Addison-Wesley, which is incorporated herein by reference.

Collator Vector Space

A second representational space in collator 108 is the collator vector space 132. The collator vector space 132 is the lower-dimensional output space of an adaptive mapping function "h" 131 whose input is the higher-dimensional collator index space 128. The function "h" 131 (often called, generically, a "neural network") is derived from a learning algorithm that analyzes the document indices 129 and the collator dictionary 130 in collator index space 128. The resulting function "h" 131 is then applied to each document index 129 to generate the collator vector space 132 and representations of the collator's corpus of documents in the collator vector space 132 (hereafter document vectors).

The collator vector space 132 created by the "h" function 131 provides an uninterpreted, self-organized representation space for documents. Even though the representation is uninterpreted, the collator vector space 132 is "semantically organized" because the mapping learns the statistics of word co-occurrence. The collator vector space 132 represents documents more efficiently and is semantically richer than the collator index space 128, thus facilitating retrieval of semantically related documents. Learning functions "h" are known to those skilled in the art of neural networks and machine learning. Examples are described in D. Rumelhart, G. Hinton, and R. Williams, 1986. "Learning internal representations by error propagation," in D. Rumelhart, J. McClelland, and the PDP Group, (Eds.), *Parallel Distributed Processing: Explorations in the Microstructure of Cognition, Volume* 1, pp. 318–366. Cambridge: The MIT Press; T. Kohonen, 1990. The Self-Organizing Map. *Proceedings of the IEEE,* 78:1464–1480; G. Carpenter and S. Grossberg, 1988, March. "The art of adaptive pattern recognition by a self-organizing neural network," *IEEE Computer,* 77–88. The collator vector space 132 contains vector space representations of documents as well as other real-world objects. For example, the collator vector space 132 also maintains vector space representations of topics (topic vectors), users (user vectors), and products (product vectors).

Collator Centroid Space

The third representational space in collator 108 is the collator centroid space 134. The collator centroid space 134 is to the collator vector space 132 as the collator vector space 132 is to the collator index space 128: a semantically amplified, more efficient representational space, better suited for retrieving semantically related documents. The central requirement in defining the collator centroid space 134 is selecting representative "centroid vectors" by analyzing the document vectors managed by collator 108. Centroid vectors may or may not coincide with actual document vectors. The chosen centroid vectors span the collator centroid space 134.

Three different processes are used to identify centroid vectors. One method uses traditional clustering algorithms that first map out the inter-point distances between pairs of document vectors and then identify centroid vectors representing the densest neighborhoods of document vectors. A second method utilizes visualization tools for plotting the distribution of document vectors and manually selects centroid vectors. A third method selects important topics a priori, casting the topics in terms of text descriptions. The document indices representing those text descriptions are then projected via the "h" function 131 into the collator vector space 132 as "artificial" centroid vectors.

The collator centroid space 134 is thus formed by analyzing the collator vector space 132 with a clustering process to determine centroid vectors that represent central concepts in the collator vector space 132. The output of the clustering process is a set of centroid vectors that represent the "axes" of the collator centroid space 134. The "p" function 133 operates to map document vectors from the collator vector space 132 into the collator centroid space 134.

Figure 10A:
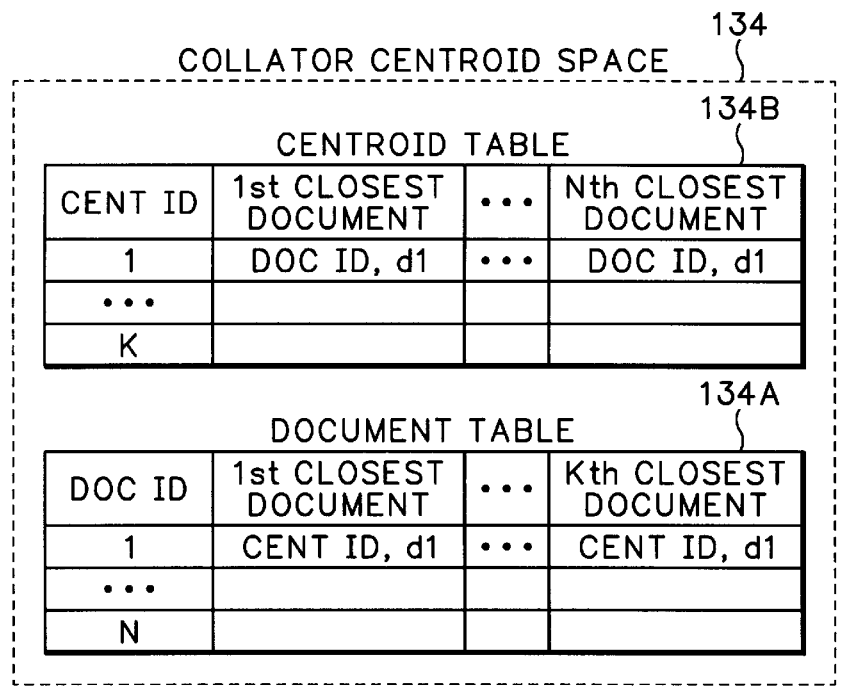
FIG. 10A is a detailed block diagram of a centroid space of the collator shown in FIG. 9.

Referring to FIG. 10A, the collator centroid space 134 in one embodiment of the invention is described by a document table 134A and a centroid table 134B. Both these tables are used to efficiently retrieve semantically related documents. The document table 134A contains one row for each document managed by collator 108. The columns of the document table 134A correspond to centroid vectors and provide an ordering of "semantic distances" from the particular document to the various centroid vectors. Distance metrics can be used to compute the semantic distance or "semantic similarity" between any two representations in the collator vector and centroid spaces. For example, the cosine function computes a magnitude-independent similarity of direction between two vectors. Greater-numbered columns represent greater distance from the document represented by the row. Each cell in the document table 134A includes a centroid ID "CentID" and the distance "d1" (in collator centroid space 134) between that centroid vector and the document vector listed in that row. Each row in the document table 134A is created by applying the "p" function 133 (FIG. 9) to a document vector and then sorting the resultant list of document-to-centroid distances in increasing order.

The centroid table 134B provides a canonical ordering of centroid vectors. The centroid table 134B contains one row for each centroid vector output by the clustering process. The centroid vectors are the axes of the collator centroid space 134 and the principle components of the collator vector space 132. The centroid table 134B is an inverted version of the document table 134A: the centroid table 134B relates centroid vectors to closest document vectors, whereas the document table 134A relates document vectors to closest centroid vectors. Referring back to FIG. 9, both tables are created by a clustering process and the "p" function 133 which locates document vectors in the collator centroid space 134. Clustering algorithms are known to those skilled in the art and are described in E. Rasmussen, 1992. "Clustering Algorithms," in W. Frakes and R. Baeza-Yates, (Eds.), *Information Retrieval: Data Structures and Algorithms,* pp. 419–442. Upper Saddle River, N.J.: Prentice Hall, which is incorporated herein by reference.

An example of a "p" function 133 is given by the projection function which enumerates the distances to all centroid vectors for a given document vector. This embodiment of "p" creates the coordinates of the document in collator centroid space 134 by applying the vector space's distance metric to measure the distance (i.e., semantic similarity) between the document vector and each centroid vector.

Figure 10B:
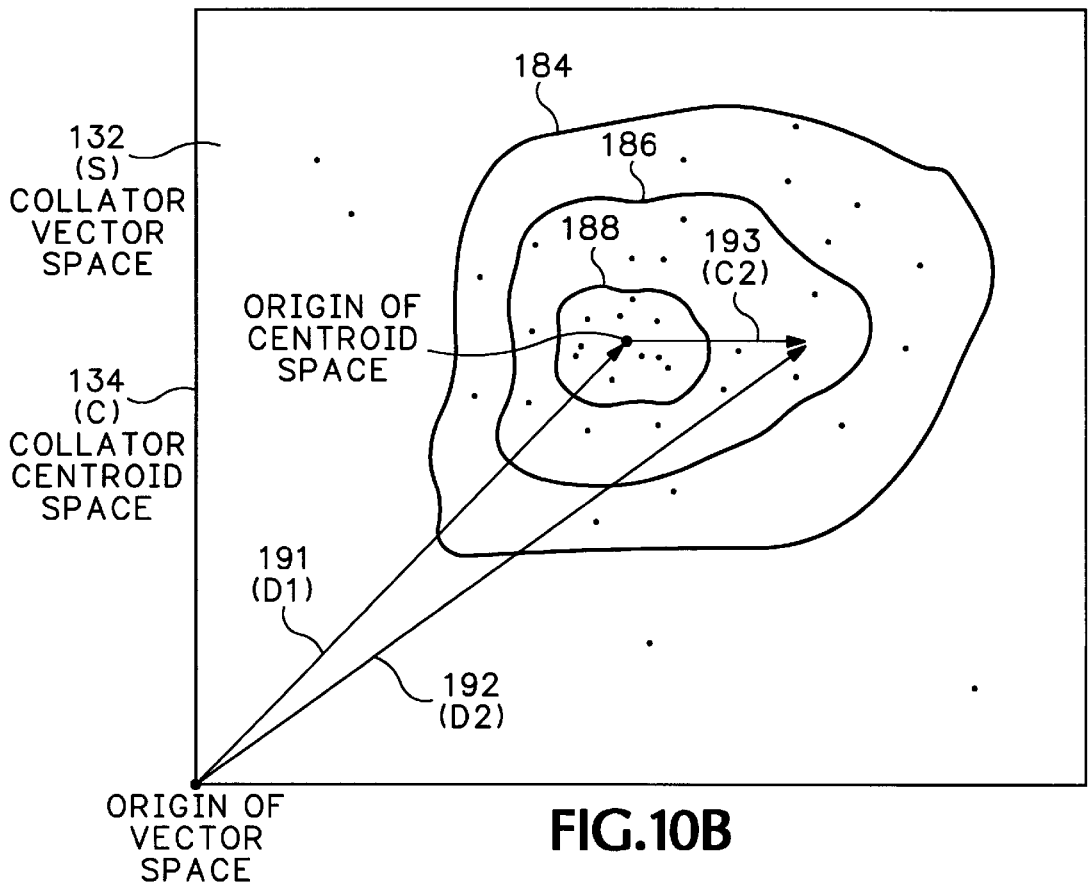
FIG. 10B is a graphical representation of a vector space maintained by the collator in FIG. 9.

FIG. 10B is a schematic diagram describing a collator vector space 132, denoted S, and includes a centroid vector 191 (D1) and another document vector 192 (D2). D2 is projected into S by applying function "h" 131 (FIG. 9) to the original document index 129 (FIG. 9) in collator index space 128 (FIG. 9). The function "p" 133 (FIG. 9) projects D1 and D2 into a set of coordinates defined by the centroid vectors of the collator centroid space 134, denoted C. In this example, C is a single-dimensional collator centroid space because it has one centroid vector D1. In S, the function "p" projects D2 into the vector 193 (C2) in C, defining D2 with respect to D1. Thus, D2 is the representation of a document in the collator vector space 132 (S), whereas C2 is the representation of the same document in the collator centroid space 134 (C). Transformations from S to C are accomplished via the function "p," which takes a point within the semantic landscape of S and projects it into the hyperspace created by the relatively small number of centroid vectors which characterize the essential features of S.

The collator vector space 132 (S) can be viewed as a semantic landscape with topographic elevation changes 184, 186, and 188 that quantize document density. Where document density is high, there is a rise in elevation, such as shown in elevation regions 186 and 188. If S is a map of the terrain, the centroid vector 191 (D1) can be seen as labeling one hilltop with semantic content. The result of applying the function "p" 133 (FIG. 9) to any document vector 192 (D2) is an ordered list of distances from all centroid vectors (such as D1) within the semantic landscape. Thus, the vector 193 (C2) provides coordinates which locate D2 with respect to the hilltop identified by D1.

Collator Goodness Space

Referring back to FIG. 9, of particular interest is a final and most efficient representational space in collator 108 referred to as the collator goodness space 153. The collator goodness space 153 is a one-dimensional space that reduces all information about a document to a single real value representing the "fit" of the document with a particular collator 108. The collator goodness space 153 is described by a list of values in the goodness table 153A (FIG. 11).

The goodness table 153A (FIG. 11) is created by applying a function "g" 152 to the rows of document table 134A (FIG. 10A) to calculate goodness scores. Each row in the goodness table 153A contains a real value which is a summary of the corresponding row in the document table 134A. A goodness score efficiently characterizes the fit of a document to a particular collator 108 by analyzing the relationship of the document vector to the centroid vectors in that collator's centroid space 134. A goodness score might be a summation of the distances from a given document vector to each of the centroid vectors; alternatively, a goodness score might be an average or other statistic of the distribution of document-to-centroid distances found in a row of the document table 134A. Since a collator 108 maintains a set of documents covering many concepts, and since concepts are efficiently represented in collator vector space 132 by centroid vectors, goodness is robustly captured by a summary statistic of document-to-centroid distances. In the semantic landscape S (FIG. 10B), the goodness score can be viewed as a measure of how close a given document vector is to the tops of one or more hills (centroid vectors). The goodness table 153A (FIG. 11) contains goodness scores for every document in the collator's corpus of documents. However, a goodness score can also be computed for any document provided to a collator 108 by a mite 106 or liaison 88.

The "h" function 131, "p" function 133, and "g" function 152 combine to reduce to a single dimension the high dimensionality of the collator index space 128 by projecting document indices 129 into successively more semantically amplified and efficient representational spaces: the collator vector space 132, collator centroid space 134, and collator goodness space 153, respectively. The collator goodness space 153 is the simplest representation of the fit of a document to a collator 108 and facilitates retrieval of semantically related documents from a collator 108. These functions can be applied to documents provided by mites 106 and queries provided (as documents) by liaisons 88 to a collator 108.

Collator Life Cycle

Figure 12A:
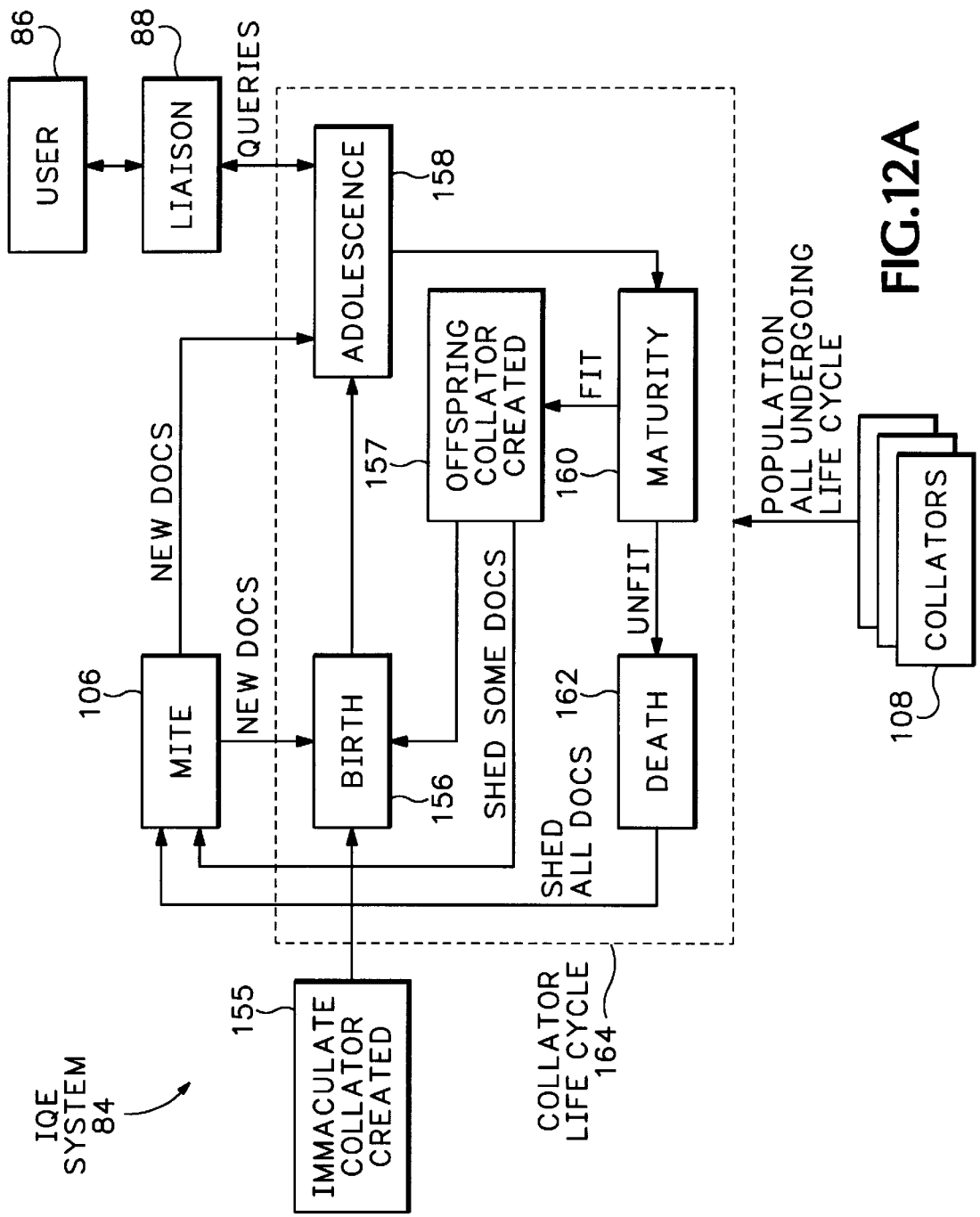
FIG. 12A is detailed block diagram showing the life cycle of the collator shown in FIG. 9.

Classification and collection of documents by collators 108 are influenced by three different mechanisms of self-organization. First, collators 108 determine the semantic similarity between any two documents via internal functions "h" 131 and "p" 133 adapted to accommodate the conceptual nature of a particular corpus of documents. Second, mites 106 feed to collators 108 new documents which are a good fit to a collator's existing corpus, thereby enabling collators 108 to become managers of specialized collections of documents. Third, based on user feedback, collators 108 evolve to acquire documents entailing specific (i.e., popular) conceptual content and discard unpopular content, thus amplifying the "semantic signal" exemplified by the dominant parts of their corpus of documents. Referring to FIG. 12A, these three mechanisms occur during collator birth 156, adolescence 158, and maturity 160, respectively, which together describe the collator life cycle.

The collator life cycle is part of the evolution-like framework of the IQE system 84 in which the population of collators 108 resides. In general, the two principle components of evolution are variability and selection. Variability occurs through collator 108 interaction with mites 106 which control the distribution of new documents to the population of collators 108 at birth 156 and during adolescence 158. Selection is performed when at maturity 160, the IQE system 84 allows reproduction of a finite population of fit collators 108 whose genetic material (i.e., documents, vector space, and centroid space) is judged to be successful at satisfying the information desires of users 86 as expressed by liaison 88 queries. Collators 108 judged to be unfit at maturity 160 are killed off 162, releasing their documents back to mites 106. Over the time span of multiple generations, this evolutionary framework breeds collators 108 well-adapted to environmental constraints (i.e., user feedback). This model contributes to the goal of the IQE system 84: "intelligent" searching of the sparse information space defined by the original documents in the asset tank 78 (FIG. 4).

Collator Birth

At birth 156, new collators are either "offspring" collators 157 or "immaculate" collators 155. Offspring collators 157 are each the descendant of a single, mature, fit collator. Immaculate collators 155 are created as a result of "world events". For example, a world event is the IQE system 84 receiving a new group of documents from a new information source, requiring expansion of IQE system 84 resources and the birth of one or more new collators. Offspring collators 157 inherit some genetic material (i.e., documents) from their parent collator, whereas immaculate collators 155 begin life with an initial set of documents provided solely by mites 106. Referring back to FIG. 3, an immaculate collator 155 (FIG. 12A) created by a world event contains a vector space 42 and is given an initial set of documents 50 by mites 106 (FIG. 12A). In either case, new collators start life with an initial bounded set of document indices 129 (FIG. 9) that represents a subset of the index tank 80 (FIG. 8), as well as a collator dictionary 130 (FIG. 9).

Referring to FIG. 12A, during birth 156, a collator 108 undergoes a developmental process that builds mappings of documents among the different representational spaces described in FIG. 9: collator index space 128, collator vector space 132, collator centroid space 134, and collator goodness space 153. Function "h" 131 (FIG. 9) is learned during this time, and functions "p" 133 (FIG. 9) and "g" 152 (FIG. 9) are applied. However, at any time, world events may trigger global changes to the "p" and "g" functions of any or all collators 108.

For offspring collators 157, functions "p" and "g" are directly inherited from the parent, whereas function "h" is indirectly inherited as a result of some documents being passed on to the offspring collator from the parent. Function "h" is relearned by the offspring collator 157 based on its new corpus of documents, but since this includes a subset of the parent collator's documents, the offspring collator's relearned function "h" shares some successful attributes of the parent collator's function "h." For immaculate collators 155, function "h" is learned based on the immaculate collator's new corpus of documents, and processes for functions "p" and "g" are provided by the IQE system 84.

As a result of this developmental process that occurs during collator birth 156, function "h" (which typically involves a neural network process) evolves during multiple generations of collators as a result of environmentally (user-) induced changes in the makeup of the corpus of documents managed by each collator. Infantile collators do not interact with liaisons 88 until all of the collator's representational spaces have been created (i.e., until the developmental process is complete), at which point the collator reaches adolescence 158.

Collator Adolescence

Adolescent collators 158 interact with liaisons 88 to recommend documents in response to queries generated by liaisons 88 on behalf of users 86. Adolescent collators 158 also interact with mites 106 as mites 106 continue to transport document indices from the index tank 80 (FIG. 8). The majority of a collator's lifetime is spent in the adolescent phase 158 providing services to liaisons 88 and gathering new document indices from mites 106 to specialize in documents describing specific (popular) concepts.

Adolescent collators 158 are in active service of queries by liaisons 88. Adolescence begins with all of a collator's documents already mapped into the collator centroid space 134 (FIG. 9). Servicing of queries entails an emulation of this process in order to map queries into the collator centroid space 134. Once a query has been mapped into the collator centroid space 134, the adolescent collator 158 utilizes the "find_similar" function 352 (FIG. 15B) to compare the query to the representations of other objects (e.g., documents, users, products) in the collator centroid space 134 in order to identify those most similar to the query based on semantic distance. The result takes the form of a recommendations list 233 (FIG. 16).

Referring back to FIG. 10B, a collator vector space 132 is filled with vector representations of documents and queries (and other real-world objects such as users and products). These vectors are not transferable between collators 108 (FIG. 8) because each collator vector space 132 represents documents differently as a result of the statistical learning algorithms applied to generate the collator vector spaces 132. Each document represented in one of the representational spaces of a collator 108 is subject to the distance metrics defined for that representational space, so a semantic distance can be calculated between any two representations. In this way, a collator 108 services queries by liaisons 88 (FIG. 12A) by computing the semantic similarity between the query and the objects represented in the collator's representational spaces. Query processing by collators 108 is described below in further detail in "Query Processing by Collators."

Referring to FIG. 12A, queries by liaisons 88 of adolescent collators 158 do not change the various representations of documents managed by the collators, but a collator's corpus of documents may grow in size due to the inclusion of new documents transported to the adolescent collator 158 by mites 106. Suitability of documents for transport is determined, in part, by seeing if the document provides a good "fit" to the adolescent collator 158. This decision process is conducted by mites 106 but employs functions "h", "p", and "g" of each collator 108 to calculate a goodness score for each candidate document. Referring back to FIGS. 9, 10A, and 11, when a new document is added to a collator's corpus of documents, new entries are created in the collator dictionary 130, collator vector space 132, document table 134A, centroid table 134B, and goodness table 153A. This acquisition of new documents which are a good "fit" to the collator enables an adolescent collator 158 to specialize its collection around certain concepts and ensures that some genetic shuffling takes place.

Collator Maturity

Collator maturity 160 is a world event triggered by the IQE system 84 at any time. At collator maturity 160, a collator is evaluated by various fitness criteria to determine whether it should be allowed to reproduce and create an offspring collator 157 or killed off 162. Selection of fit collators may come from fitness measures derived from user feedback or directly from numerical evaluation of the properties of collator vector spaces or from a combination of the two. Selection may also be performed directly by human inspection of collator vector spaces. In the preferred embodiment, mature collators 160 which most often met the information needs of users 86 are selected to reproduce. Future generations of successful collators refine the expertise of the "family line" by becoming more focused on the specific semantic areas represented by the family's genetic material (i.e., the inherited corpus of documents).

A collator judged to be fit creates one offspring collator 157. The reproductive process for a mature collator 160 involves culling out those documents with low goodness scores and passing the remaining documents on to the offspring collator 157. Low goodness scores indicate documents which are not closely related to the central concepts of the collator's corpus of documents (i.e., they are semantic outliers). The resulting, focused set of documents is passed on to an offspring collator 157 as its initial genetic material, thus amplifying the "semantic signal" learned by the parent mature collator 160. For example, collator vector space 36 (FIG. 3) represents a fit, mature collator 160 which is allowed to reproduce and create an offspring collator 157 represented by vector space 41 (FIG. 3). The culled documents 44 (FIG. 3) with low goodness scores in goodness table 153A (FIG. 11) are released back to mites 106.

Mature collators 160 judged unfit are killed off 162 as represented by vector space 40 (FIG. 3). The death of the mature collator 160 containing collator vector space 40 (FIG. 3) causes mites 106 to repossess all documents in the collator's corpus of documents 48 (FIG. 3).

Collator fitness is a measure of correlation between document goodness as measured by the collator 108 and as measured by users 86. Collator assessment of documents is recorded in the goodness table 153A (FIG. 11), while user assessment of documents is recorded in feedback event tables (FETs) 226 (FIG. 22). This fitness measure applies to all collators 108, and it represents the force of environmental selection at work. Below is one example of such a fitness function.

Assume a set of users, U, each with a single FET 226 (FIG. 22). Collectively, the FETs give evaluations of a set of documents, D. The user evaluation of document j, in FET k, is denoted $r_{jk}$. Assume also that there exists a set of collators C, where each collator maintains a set of documents which is a subset of D. As described above, each collator in C has a goodness table 153A (FIG. 11) which records goodness scores, g(c,j), for each document j maintained by collator c. Fitness is defined over the sets C, U, and D by the function F, which measures the correlation between collator and user assessments of documents in D. In particular, for each collator, c:

$$F(c, U, D) = \sum_{k=1}^{N} \sum_{j=1}^{m} g(c, j) * r_{jk}.$$

Both collator goodness scores, g(c,j), and user goodness scores, $r_{jk}$, are scaled between −1.0 and +1.0, and the value 0.0 is assumed for null entries (i.e., where a collator or user has made no assessment of some document j). This function, F, yields a measure of agreement between collator c and the population of users in U. Each collator whose fitness exceeds a predetermined threshold is judged to be fit and allowed to reproduce 157, while all other collators are killed off 162.

Referring to FIG. 12B, a collator goodness table 153A for a collator c=1 has goodness scores, g(c,j), for documents j=1 to m, where m=4. The goodness scores, g(cj), for collator 1 are the following:

g(1,1)=0.5 g(1,2)=0.7 g(1,3)=−0.6 g(1,4)=−0.1

FETs 226 have the user feedback ratings, $r_{jk}$, for users k=1 to N, where N=2. The ratings in the FETs 226 for users 1 and 2 are the following:

| FET 1 | FET 2 |
|---|---|
| $r_{11} = 0$ | $r_{12} = 0.5$ |
| $r_{21} = -0.5$ | $r_{22} = 0.5$ |
| $r_{31} = -0.5$ | $r_{32} = 0$ |
| $r_{41} = 0.1$ | $r_{42} = -0.5$ |

The fitness, F(c,U,D) for collator 1 is equal to:

$$F(c, U, D) = \sum_{k=1}^{N} \sum_{j=1}^{m} g(c, j) * r_{jk}.$$
$$= (0 - 0.35 + 0.3 - 0.01) + (0.25 + 0.35 + 0 + 0.05)$$
$$= -0.06 + 0.65$$
$$= 0.59$$

Thus, collator 1 is a poor performer for user 1 (F=−0.06), and a good performer for user 2 (F=0.65), with a total overall fitness of 0.59 for the population of users, U, encompassing users 1 and 2.

For a predetermined threshold of 0.5, collator 1 is judged by the IQE system 84 to be fit and is allowed to reproduce and create an offspring collator.

Collator Evolution

Referring to FIG. 12A, the constant growth and reproduction of collators 108 causes the population to continuously evolve to both focus on specific concepts and identify new concepts. Collators 108 evolve to become better recommenders of documents containing concepts of interest to users 86. Collators 108 which attract popular documents are allowed to reproduce, while collators whose documents fail to interest users 86 are killed off 162. This selection process is accomplished by use of fitness criteria. The reproduction of popular collators 108 means that the collator vector spaces 132 (FIG. 9) which enabled them to succeed at delivering preferred documents will improve over time. That is, the reasons for a collator's 108 success (being dense in a conceptual area of interest to users 86) will be amplified over multiple generations because the responsible centroids and document clusters will persist in the hereditary line and continue to attract additional similar documents.

Figure 12C:
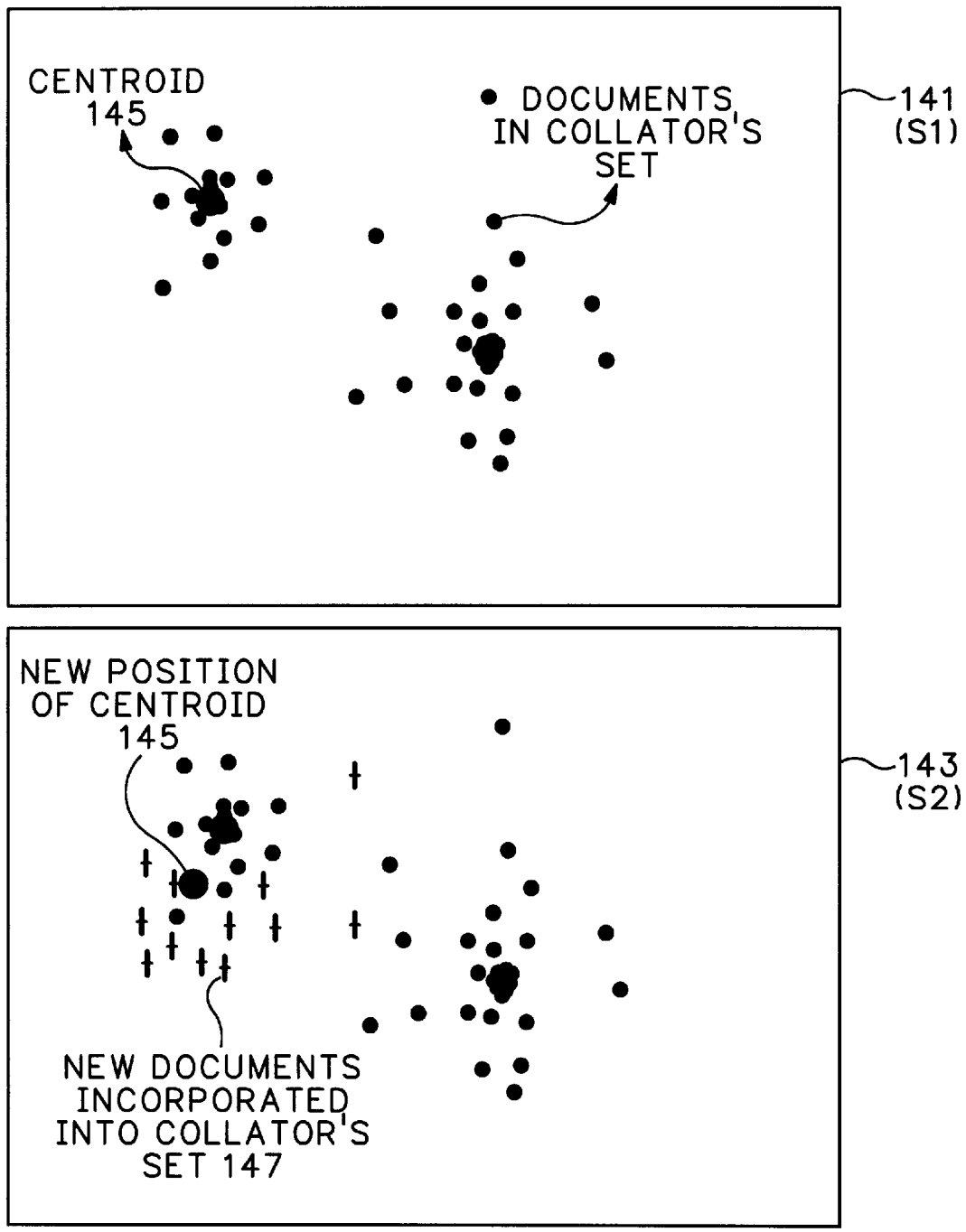
FIG. 12C is schematic diagram showing two generations of the vector space of the collator shown in FIG. 9.

Referring back to FIG. 9, successive generations of successful collators 108 will experience some drift in the properties of the collator vector space 132, collator centroid space 134, and collator goodness space 153. This is most likely to be the result of the addition of new, similar documents by mites 106 during collator adolescence 158 (FIG. 12A). For example, FIG. 12C shows a single collator vector space during one generation 141 (S1) and the next generation 143 (S2). Assuming a common orientation is employed for viewing the collator vector space, the addition of new documents 147 shown as vertical lines in S2 causes the centroid vector 145 to drift from its original position in S1 to a new position in S2 more accurately representing the larger cluster of documents in S2. This is a form of genetic shuffling which implements the important evolutionary principle of variation in the IQE system 84 (FIG. 8).

Referring back to FIG. 4, collators 108 evolve into classifiers of asset tank 78. Each collator 108 serves document recommendations over some subset of the total asset tank 78. These collator subsets are not mutually exclusive, but overlapping, and come to represent different information "views" on the documents in asset tank 78. These views propagate, insofar as there are users 86 that find the collator views useful. Every document which comes into the IQE system 84 must find a home in some collator's corpus of documents. This forced acceptance ensures that all documents are potentially available for viewing. Collators 108 are not simply filters on asset tank 78, but are also recipients of novel information which must be accommodated, at least temporarily, and which may provide a source for novel organizing structure.

Collators 108 serve different segments of the population of users 86, thus affording a wide array of user understandings to work within the IQE system 84. The internal functions of collators 108 become better amplifiers of the semantic signal that they manipulate. In essence, the semantic landscape embodied in vector spaces is constantly re-calibrated to new documents which makes possible finer distinctions along the important conceptual dimensions that each collator 108 has begun to specialize in.

MITES

Referring to FIG. 13, mites 106 "transport" new document indices to collators 108 from index tank 80. Document index transport by a mite 106 is facilitated by a source queue 105 which is automatically filled 136 by document indices originating from the information source 62 (FIG. 5) corresponding to that mite 106. Mite source queues 105 are also filled by document indices released by collators 135 during collator reproduction 157 (FIG. 12A) or as a result of collator death 162 (FIG. 12A). During collator adolescence 158 (FIG. 12A), mites 106 identify candidate collators 108 as potential recipients based upon collator-returned goodness scores 142 and a distribution process 144. All document indices are either transported 150 to one or more collators 108, archived 107, or returned 136 to the bottom of the mite source queue for a later transport attempt. Referring back to FIG. 12A, this constant provisioning of adolescent collators 158 with new documents induces variation or genetic shuffling in the collator population. The final role that mites 106 play in the collator life cycle 164 is providing an initial set of documents to newly created immaculate collators 155.

Referring to FIG. 13, the first major decision made by a mite 106 is whether or not to archive a document index. Originally, all new document indices from index tank 80 are checked in 136 to the top of the mite source queue 105. Then, the top document (d) is checked out 137 for possible transport to collators 108. Once a document index is checked out, an archive process A(d) is applied 138. The archive process A(d) 138 examines the history of the document index to determine whether the document index is a candidate for transport. For example, A(d) inspects the document index history for two properties: (1) how many collators 108 currently have the document in their corpus of documents; and (2) how many times the document index has been checked out by a mite 106 in an attempt to transport the document index. If no collators 108 currently have the document index and many attempts have been made to transport the document index, then A(d) will determine that the document is bad (i.e., of no interest to users) and the document index will be archived 107 to remove it from active circulation. Alternatively, if few or no collators 108 currently have the document and few or no attempts have been made to transport the document index, then A(d) will determine that the document is good (i.e., of potential interest to users) and the mite 108 will begin to query some collators 140 regarding the document.

The second major decision made by a mite 106 is whether or not to distribute a document index, and this decision takes place once a document index has been identified by A(d) 138 as a candidate for transport. Once a candidate document index has been identified, a mite 106 then requests from each collator (c) 108 a goodness score g(c,d) 142 for the document index (d). As discussed previously, g(c,d) assesses the semantic similarity between d and the collator's corpus of documents. Once the mite 106 receives g(c,d) from all queried collators 142, a distribution process D 144 is applied to the document index to determine which, if any, collators 108 should receive the new document index. For example, the distribution process D uses one global system parameter, g0, that specifies a goodness threshold, and a second parameter, n, which determines the preferred number of collators for the document. Documents whose goodness scores exceed the threshold for one or more collators (i.e., where g(c,d)>g0) are considered a "fit" with the appropriate collators 108 and are transported 150 to those collators (up to n collators) for addition to their respective sets of documents. Documents whose goodness scores do not exceed g0 for n collators 108 are recycled and checked back in to the bottom of the mite source queue 136 for a later transport attempt. After a distribution decision had been made, the mite 106 begins to process the next document index in the mite source queue 105.

Referring back to FIG. 12A, mites 106 provide an initial set of documents to newly created immaculate collators 155. The set of initial documents is a random selection of document indices chosen from the index tank 80 (FIG. 8). Combined with the "feeding" of adolescent collators 158 and the recycling of documents from collators 157 and 162, mites 106 thus play a crucial role in providing the genetic material for collators 108.

LIAISONS

Figure 14A:
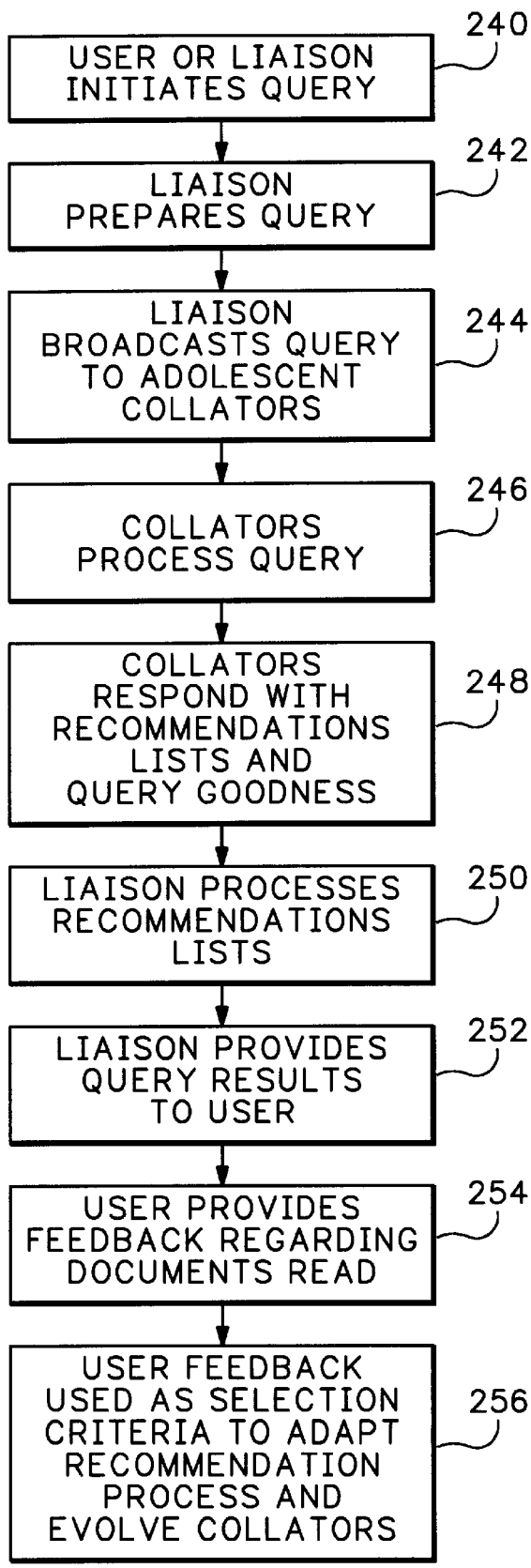
FIGS. 14A and 14B are step diagrams showing how queries are performed in the intelligent query engine system shown in FIG. 8.
Figure 14B:
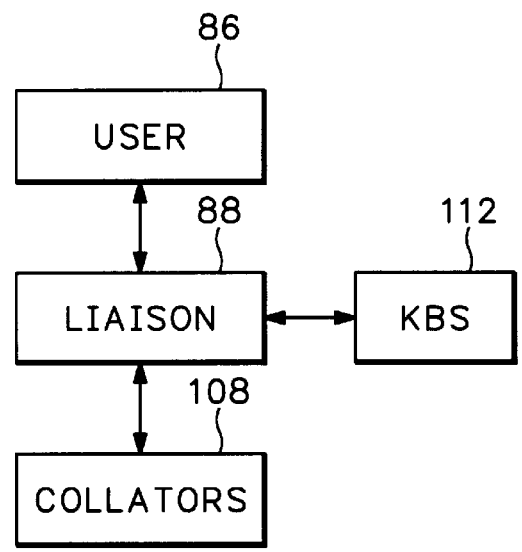

Referring to FIGS. 14A and 14B, a liaison 88 is an object which acts autonomously on behalf of a particular user 86 to retrieve information (e.g., pointers to relevant documents, users, or products) from collators 108. To do this, liaisons 88 orchestrate the generation and processing of queries which are broadcast to collators 108. Collators 108 respond to queries with recommendation lists 233 (FIG. 16) which are processed by liaisons 88 to determine final query results. Query results are presented to users 86 upon logging into the IQE system 84 (FIG. 8) via Internet or another communication channel. The IQE system 84 thus provides a mechanism for delivering relevant information to users 86.

Queries are initiated by user 86 or liaison 88 in step 240. In step 242, liaison 88 prepares the query in one of several ways depending on the type of query, as described below in "Manual Query," "Knowledge-Based Query," "User Query," "Type 1 Social Query," and "Type 2 Social Query." Once the query is prepared, liaison 88 in step 244, broadcasts the query to collators 108. Only adolescent collators 158 (FIG. 12A) respond to queries from liaisons 88. In step 246, collators 108 process the query to find semantically similar documents, users, or other objects stored in the collator's representational spaces, as described below in "Query Processing by Collators." In step 248, collators 108 respond with recommendation lists 233 (FIG. 16) of documents, users, or other objects. In step 250, liaison 88 processes the recommendation lists 233 from multiple collators 108 to produce the query results, as described below in "Recommendations Processing by Liaisons." In step 252, the query results are presented to user 86 via a graphical user interface (not shown) or stored for later presentation to user 86. Feedback from user 86 regarding the relevancy of documents read is provided in step 254. Finally, in step 256, user feedback is used as selection criteria to evolve collators to improve future recommendations and to improve the collator recommendation process as described below in "Adapting FETs To User Feedback."

A query is a method performed by liaison 88 that utilizes information about user 86 to generate recommendations from a set of collators 108. There are five types of queries: manual queries (FIG. 18), knowledge-based queries (FIG. 19), user queries (FIG. 21), type 1 social queries (FIG. 23), and type 2 social queries (FIG. 24). A manual query is based on words or phrases manually entered by user 86. A knowledge-based query is based on user profile data that symbolically characterize user 86 in terms of sets of interrelated facts or concepts. A user query is based on explicit (user-provided) and implicit (system-inferred) feedback about the relevance of documents with which user 86 interacts over time. Both types of social query are based on information representing the reading interests of other users determined to be similar to user 86. All queries, with the exception of the manual query, are initiated automatically on behalf of user 86 by liaison 88 in accordance with a predetermined time schedule adjusted to fit system resources and user priority. The precise nature of query preparation (step 242), query broadcasting (step 244), collator processing (step 246), recommendation lists (step 248), and recommendation processing (step 250) is described in further detail in the following sections.

Query Processing by Collators

Figures 15A, 15B:
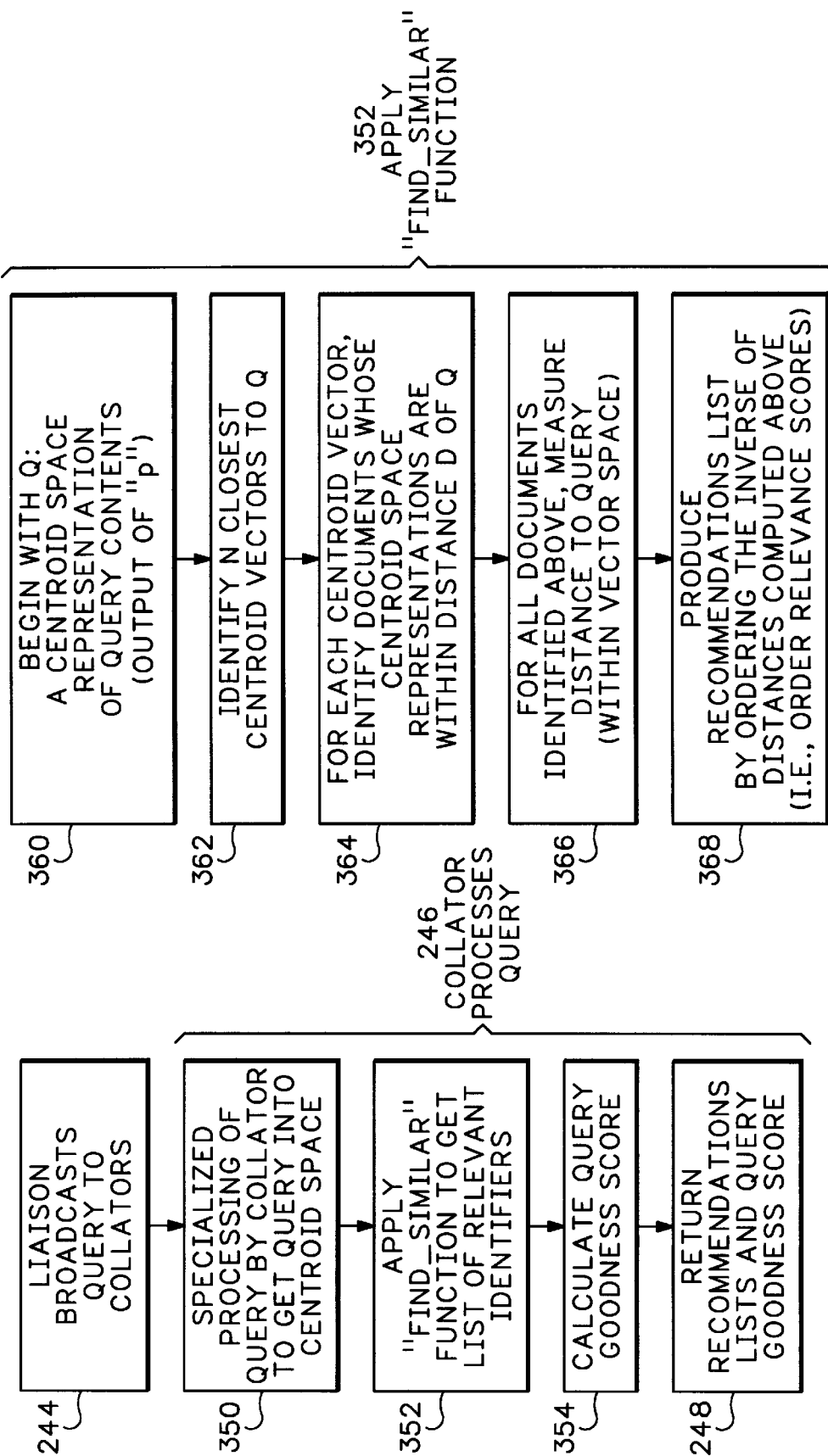
FIG. 15A is a step diagram showing how processing of queries is performed by the collator shown in FIG. 9.
FIG. 15B is a step diagram showing how a "find_similar" function described in FIG. 15A is performed by the collator shown in FIG. 9.

Once a query is prepared by a liaison 88 in step 242, it is broadcast to a set of collators 108 in step 244. Referring to FIGS. 14B and 15A, the collators 108 process the query in step 246, which is further described by steps 350, 352, and 354. In step 350, specialized query processing is performed by collator 108 based on the type of query. The result of step 350 is that all types of queries are mapped into the collator centroid space 134 (FIG. 9). In step 352, the "find_similar" function (FIG. 15B) is applied to the query representation in collator centroid space 134 to produce a recommendations list 233 (FIG. 16) referring to documents, users, products, or other objects depending on the type of query. In step 354, the query goodness is calculated by collator 108 to provide a scaling factor for the recommendations list 233. Finally, in step 248, the recommendations list 233 and query goodness are returned by each collator 108 to the querying liaison 88. Variations of this process that depend on the type of query are described below in "Manual Query," "Knowledge-Based Query," "User Query," "Type 1 Social Query," and "Type 2 Social Query."

The "find_similar" function 352 produces a recommendations list 233 (FIG. 16) containing the closest objects to the query ordered by semantic distance. The "find_similar" function 352 does this by first comparing the query against the centroid vectors in collator centroid space 134 (FIG. 9) to identify candidate clusters of object vectors (i.e., representations of objects in collator vector space 132 (FIG. 9)) and only then comparing the query against the resulting set of object vectors to find the closest matches. Without the "find_similar" function 352, the query would have to be compared against every object vector. Thus, the "find_similar" function 352 significantly reduces the number of semantic comparisons in collator vector space 132 required to produce a recommendations list 233.

Referring to FIG. 15B, the "find_similar" function 352 begins in step 360 with Q, a collator centroid space 134 (FIG. 9) representation of the query. As described earlier, Q is the output of applying function "p" 133 (FIG. 9) to the vector space representation of the query to map the query into collator centroid space 134; if the query is an existing document index, Q is already stored in a row of the document table 134A (FIG. 10A). In step 362, the N closest centroid vectors to Q are identified, where N is a threshold variable specifying the number of centroid vectors to compare the query against. In step 364, the centroid table 134B (FIG. 10A) is utilized to identify all of the object vectors within a distance $d1 \leq D$ of each of the N selected centroid vectors, where D is a threshold variable specifying the maximum distance that an object can be from a centroid vector and still be considered "close" to the centroid vector. The result of step 364 is a set of candidate object vectors. In step 366, the semantic distance (relevance score) is computed between the object vectors and the query in the collator vector space 132 (FIG. 9). Finally, in step 368, the resulting semantic distances (relevance scores) are ordered inversely to produce a recommendations list 233 (FIG. 16) of the closest objects to the query.

Referring back to FIGS. 14B and 15A, during query processing, collators 108 calculate another piece of information: the query goodness score in step 354. This score is used as a scaling factor on the recommendations list 233 (FIG. 16) so that the recommendations lists 233 provided by multiple collators 108 can be accurately combined, as described in the next section. The process of calculating the goodness score for a query is similar to that described in FIG. 13, where mites request goodness scores 142 from collators 108. As described in FIG. 9, the query representation in collator centroid space 134 is mapped into collator goodness space 153 by applying the "g" function 152. The query goodness score, in one example, is the summation of the distances from the query to each of the collator centroids (see above "Collator Goodness Space"). The result is the query goodness score, which is delivered with the recommendations list 233 by collators 108 in response to aquery.

Recommendations Processing by Liaisons

The merging of multiple recommendations lists 233 (FIG. 16) that occurs in step 250 (FIG. 14A) is based on a weighted, normalized summation of the lists. For example, referring to FIG. 17, a query is broadcast to two collators that return recommendations lists 340 and 342. First, the query goodness scores of 0.8 and 0.5 are used to weight the recommendations lists 340 and 342 in order to adjust the relevance scores according to the overall "fit" of the query with each collator. Second, the weighted relevance scores for each identifier are summed among all recommendations lists. For identifier 1, the sum is (0.9*0.8)+(0.7*0.5)=1.07. Third, the summed, weighted relevance score is normalized by the number of recommendations lists in which each identifier occurs. For identifier 1, the final score is 1.07/2= 0.535, where the normalizing factor, 2, is the total number of lists in which identifier 1 occurs. Thus, the merged recommendations list 344 represents a rank-ordering of the identifiers most relevant to the original query, where the identifiers refer to documents, users, products, or other objects depending on the type of query. This final list is presented to user 86 via a graphical user interface (not shown) or stored for later presentation to user 86.

Manual Query

Figure 18:
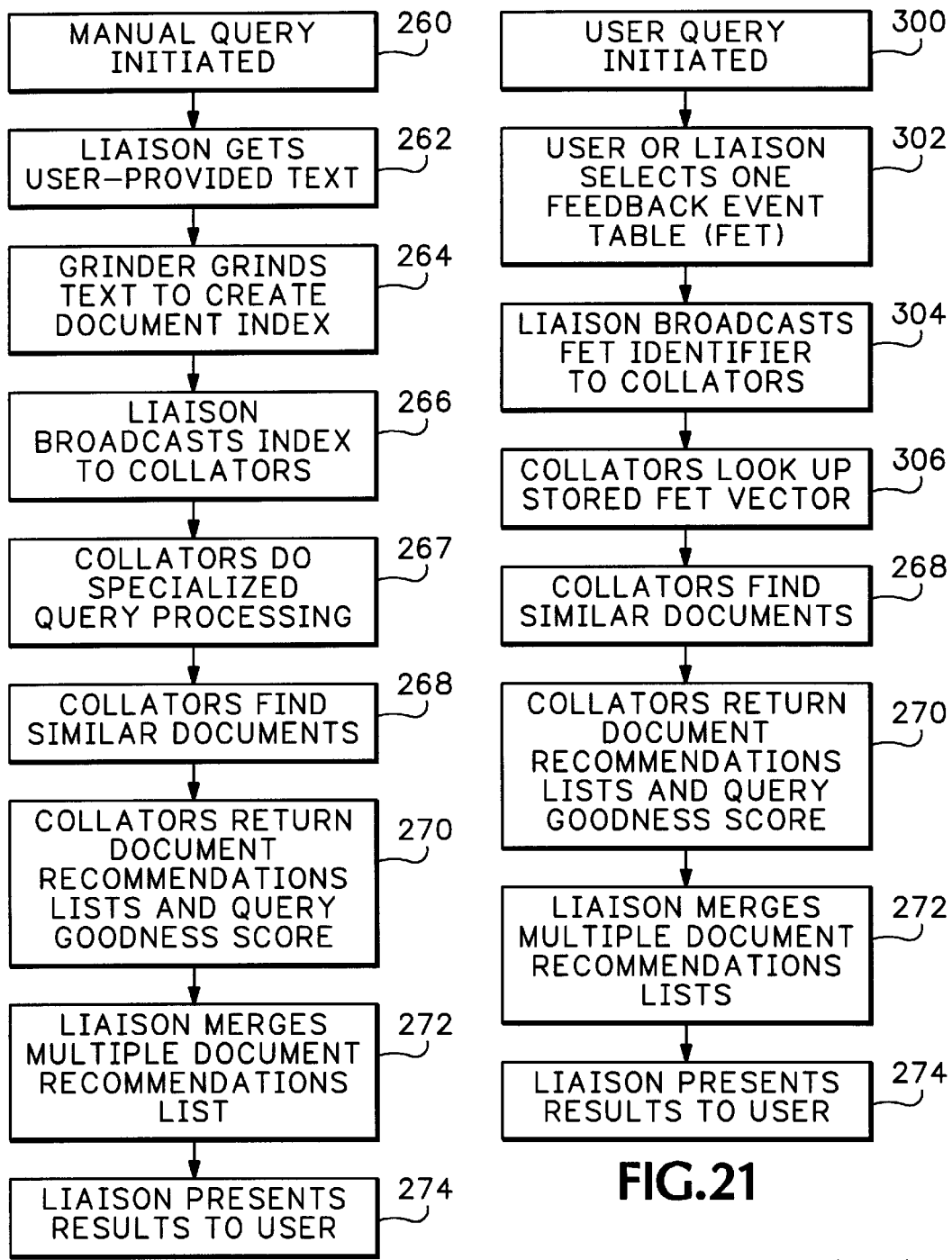
FIG. 18 is a step diagram showing the process of a manual query.

Referring to FIG. 18, a manual query can be viewed as a traditional free text "search" of the index tank 80 (FIG. 8). A manual query is initiated by user 86 in step 260 via a graphical user interface (not shown). In step 262, liaison 88 gets the words or phrases entered by user 86. In step 264, that text is passed to a grinder 100 (FIG. 7) which creates a query (document) index 102 (FIG. 7) from the text. In step 266, liaison 88 broadcasts the query index to collators 108 and requests a recommendations list 233 (FIG. 16) of similar documents.

In step 267, collators 108 perform specialized query processing. For manual queries, referring back to FIG. 9, this specialized processing is simply the application of function "h" 131 to the query index to map it into collator vector space 132, followed by application of function "p" 133 to map the query vector into collator centroid space 134, a prerequisite for utilizing the "find_similar" function 352 (FIG. 15B) described above.

In step 268, collators 108 utilize the "find_similar" function 352 (FIG. 15B) to find similar documents and return a recommendations list 233 (FIG. 16) and query goodness score in step 270, as described above in "Query Processing by Collators." In step 272, liaison 88 merges the multiple recommendations lists 233 returned by multiple collators 108. The merge process is described above in "Recommendations Processing by Liaisons" and utilizes query goodness scores as weights. Finally, in step 274, the final list of documents is presented to user 86 via a graphical user interface (not shown) or stored for later presentation to user 86. In this way, the IQE system 84 (FIG. 8) delivers relevant documents to user 86 based on a free text query.

Knowledge-Based Ouery

Figure 19:
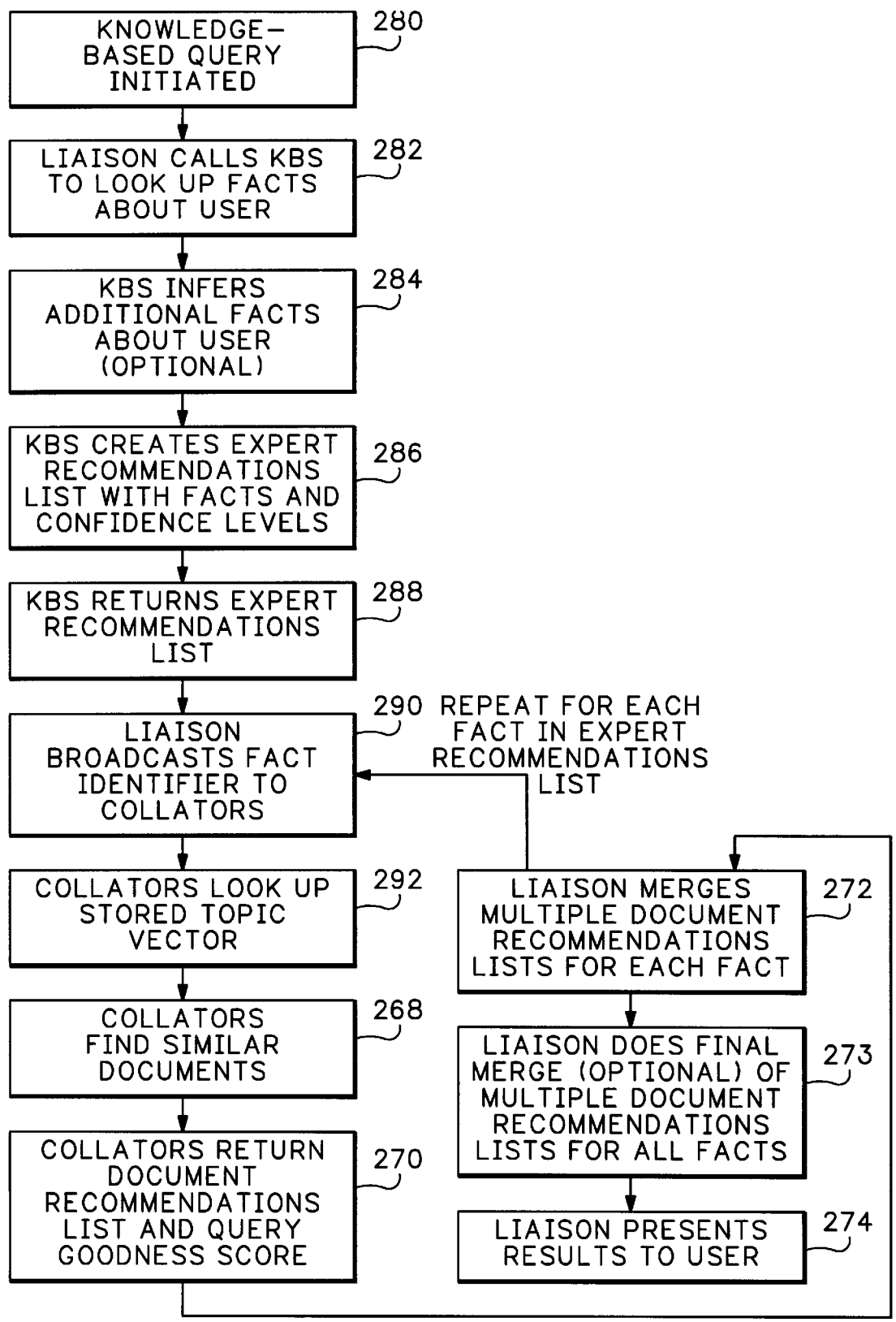
FIG. 19 is a step diagram showing the process of a knowledge-based query.

Referring to FIGS. 14B and 19, a knowledge-based query is initiated by liaison 88 in step 280. In step 282, liaison 88 calls knowledge-based system (KBS) 112 to look up facts about user 86. KBS 112 does this by retrieving the user's profile data from the user tank 82 (FIG. 8). Then, optionally, KBS 112 infers additional facts about user 86 in step 284. Based on the facts about user 86, KBS 112 in step 286 creates an expert recommendations list 224 (FIG. 20) containing facts relevant to user 86 weighted by "confidence levels" for each fact. The expert recommendations list 224 is returned in step 288 to liaison 88. In step 290, liaison 88 broadcasts a single fact identifier to collators 108 and requests a recommendations list 233 (FIG. 16) of similar documents. Each fact identifier in an expert recommendations list 224 is broadcast as a separate query to collators 108 to keep distinct the query results for each fact. KBS 112 and the expert recommendations list 224 are described in detail below in "Knowledge-Based System (KBS)."

In step 292, collators 108 perform specialized query processing. For knowledge-based queries, this specialized processing involves recalling the stored representation of the topic corresponding to the broadcast fact identifier. Each collator vector space 132 (FIG. 9) maintains vector space representations of these topics (hereafter topic vectors). Function "p" 133 (FIG. 9) is then applied to the topic vector to map it into collator centroid space 134 (FIG. 9), a prerequisite for utilizing the "find_similar" function 352 (FIG. 15B) described above.

In step 268, collators 108 utilize the "find_similar" function 352 (FIG. 15B) to find similar documents and return a recommendations list 233 (FIG. 16) and query goodness score in step 270, as described above in "Query Processing by Collators." In step 272, liaison 88 merges the multiple recommendations lists 233 returned by multiple collators 108. The merge process is described above in "Recommendations Processing by Liaisons" and utilizes query goodness scores as weights. The resulting merged recommendations list 233 contains documents similar to a single query corresponding to a single fact/topic for user 86. Because multiple facts are relevant to user 86, steps 290, 292, 268, 270, and 272 are repeated for each fact in expert recommendations list 224 (FIG. 20) for user 86.

After all of the facts in expert recommendations list 224 have been separately processed by collators 108 and liaisons 88 to create merged recommendations lists 233, a final optional merge may be performed by liaison 88 in step 273. This final merge combines the just-merged recommendations lists 233 corresponding to each fact in expert recommendations list 224 for user 86. The merge process is similar to that described above in "Recommendations Processing by Liaisons" except that it utilizes the confidence levels corresponding to each fact as weights. Finally, in step 274, the final list of documents is presented to user 86 via a graphical user interface (not shown) or stored for later presentation to user 86. In this way, the IQE system 84 (FIG. 8) delivers relevant documents to user 86 based on the user's profile data 82 (FIG. 8).

Knowledge-Based System (KBS)

Figure 20:
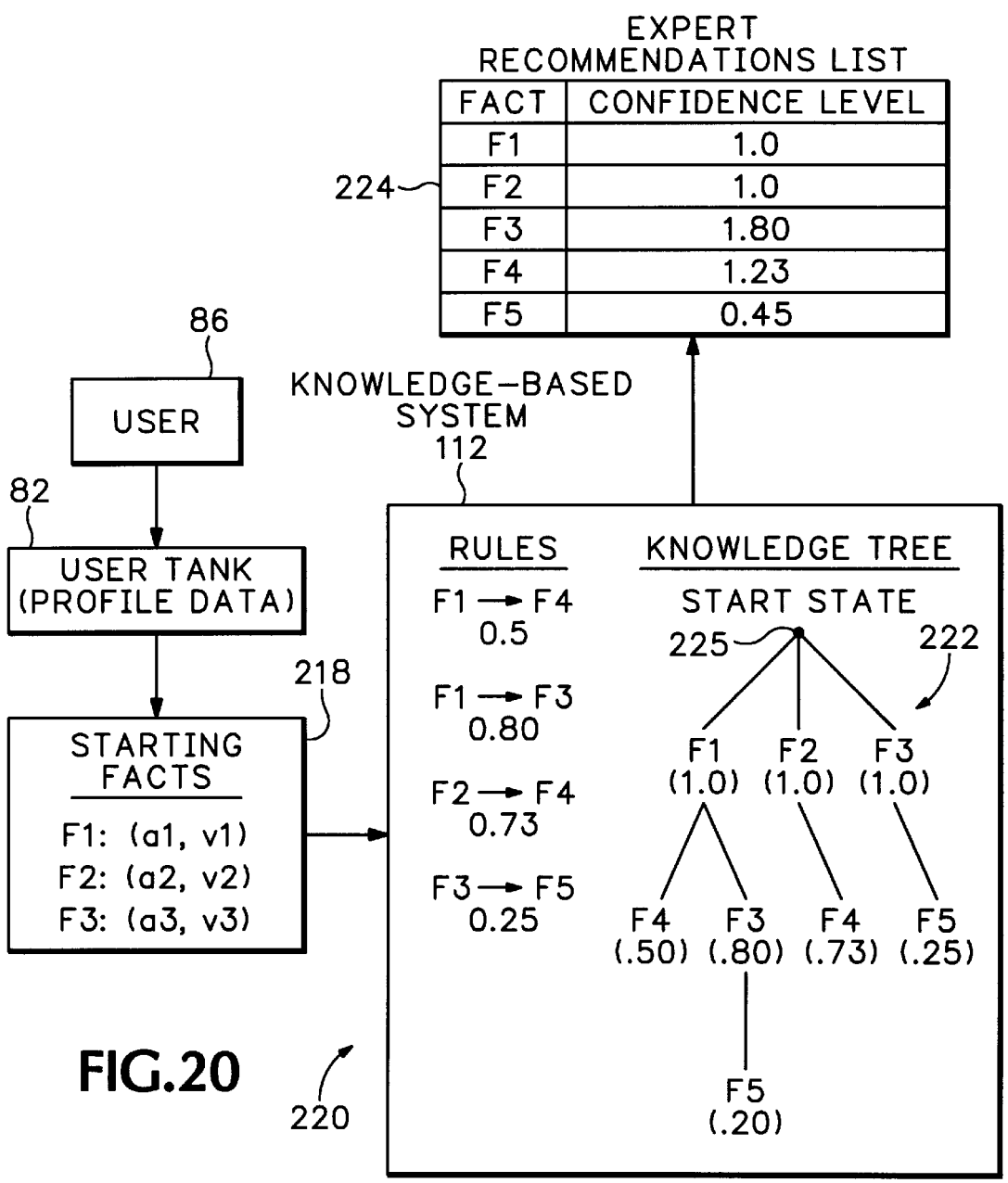
FIG. 20 is a block diagram showing generation of an expert recommendations list used to facilitate knowledge-based queries in FIG. 19.

Referring to FIG. 20, when recruited for a query, KBS 112 generates an expert recommendations list 224. This entails looking up facts asserted in the user's profile data in user tank 82; alternatively, KBS 112 may use relations which connect facts asserted by user 86 to infer additional facts to include in the query. In the simplest case, the KBS 112 retrieves the user's profile data 82 to look up a set of facts asserted by user 86. In the preferred embodiment, the facts which participate in the user's profile are established by a knowledge engineering process which models a disease in terms of atomic symbols such as "diagnosed_with_breast_cancer." Facts are then asserted by user 86 through an interview which asks questions of user 86. The choice of questions to ask is inferred by KBS 112 based on the user's answers to prior questions. For example, if a user asserted the fact, "diagnosed_with_breast_cancer," the KBS 112 would then ask the user to indicate the clinical staging of her breast cancer at diagnosis. Alternatively, KBS 112 may generate the facts from an extended set of concepts based on the knowledge models applicable to user 86.

KBS 112 utilizes "expert knowledge" or a "knowledge base" to generate queries. Expert knowledge is constituted by a corpus of rules of the form "FACT1→FACT2," where FACT1 and FACT2 are propositional facts coded as attribute-value pairs. The "→" symbol specifies a relation which connects the two facts into a proposition, sometimes with an attached real value specifying a probability for the expressed proposition. For example, the relations "causes" and "is_treated_by" are used in the propositions "HIV-causes→AIDS" and "AIDS-is_treated_by→AZT."

Knowledge bases are constructed from both manual library research and automated translation of machine-readable databases. Knowledge bases are maintained in KBS 112, which captures facts and relationships among facts in a standard symbolic framework used by IQE system 84 (FIG. 8) to improve document categorization and retrieval. This improvement is accomplished by providing an automated mechanism for translating between the detailed knowledge of the domain describing user 86 and the semantic organization of document vectors in collator vector space 132 (FIG. 9). For example, KBS 112 translates between a medical domain (as known by a patient or caregiver and expressed by user 86 in answer to questions presented to user 86 during an interview) and the semantic space of document vectors. Thus, KBS 112 makes it possible to map the user-asserted fact, "diagnosed_with_breast_cancer," to a query that will return a set of documents semantically related to breast cancer.

FIG. 20 describes an example knowledge base of KBS 112 and the generation of an expert recommendations list 224. The starting facts F1, F2, and F3 218 are extracted by liaison 88 from user tank 82 for user 86. These are the symbolic profile data which have been asserted by user 86 about himself or herself. A set of facts 220 are "inferred" from the starting facts 218 by way of a set of rules, which can be represented by a knowledge tree 222. The root node 225 of the knowledge tree 222 represents the start state of a procedure for inferring facts from starting facts 218. The first level of nodes (those descendent from root node 225) represent starting facts which are asserted in the user's profile data 82. All lower-level nodes represent inferred or derived facts. Each branch in the knowledge tree 222 which lies below the starting facts represents a rule which derives one fact (a lower node) from another (a higher node) with some probability or "confidence." In other words, a rule's probability represents a weighted edge which connects two nodes in the knowledge tree 222. The knowledge tree 222 is used to create a set of inferred facts which are then employed as keys for locating relevant documents for retrieval. The knowledge tree 222 narrows the search for facts by following only the most promising branches and provides a reliable halting condition. Confidence levels are the product of weighted edges and are accumulated as edges get traversed. When the accumulated confidence level for any path becomes equal to or less than a threshold value, traversal along that path terminates.

The expert recommendations list 224 is produced using a threshold value of 0.75. A threshold value of 1.0 would simply produce an expert recommendations list 224 consisting of the user's profile data—the starting facts. After the inference procedure halts, all uniquely labeled nodes visited during the procedure are recorded in a two-column expert recommendations list 224. The expert recommendations list 224 identifies the fact and confidence level associated with each fact If multiple nodes traversed along different paths label the same fact, then the separate confidence levels are combined using a summation of confidence levels. Collators which are specialists in specific conceptual areas have topics corresponding to facts on or near the centroids for those conceptual areas and will thus be capable of recommending many documents of relevance to those facts.

Feedback Event Tables (FET)

Referring to FIGS. 14B and 22, a feedback event table (FET) 226 contains a set of documents rated as good or bad by user 86 or liaison 88. A user 86 has one or more FETs 226; the precise number of FETs 226 for user 86 is determined by that user's preference for organizing information via the graphical user interface. Liaisons 88 may also create FETs 226 for user 86. A FET 226 contains two columns of information: the first holds a list of document identifiers, the second holds a single real feedback value assigned by user 86 or liaison 88 to the document. The rows of a FET 226 can be viewed as exemplars along user or liaison defined dimensions which represent, in the preferred embodiment, reading preferences. Feedback values are assigned explicitly by user 86 as a result of rating a document. Feedback values are also assigned by liaison 88 as a result of an action taken by user 86, such as opening a document to read it or storing a document in user tank 82 (FIG. 8). FET 226 are thus filled with explicit (user-provided) or implicit (system-inferred) user feedback regarding documents.

Adapting FETs To User Feedback

As described below, feedback event tables (FETs) 226 are employed by liaisons 88 in user queries and type 1 social queries to collators 108, in order to deliver personalized information to user 86.

The IQE system 84 (FIG. 8) incorporates user feedback which accumulates in feedback event tables (FETs) 226 in order to improve the information recommendations made to users 86 over time. Each FET 226 is represented in each collator's internal representational spaces; these representations are updated on a periodic basis to adapt to user feedback. Thus, the results of user queries and type 1 social queries, which are both based on the locations of FET vectors (representations of FETs in collator vector space 132) (FIG. 9) constantly track those concepts in collators 108 that are of interest to user 86.

Figure 25:
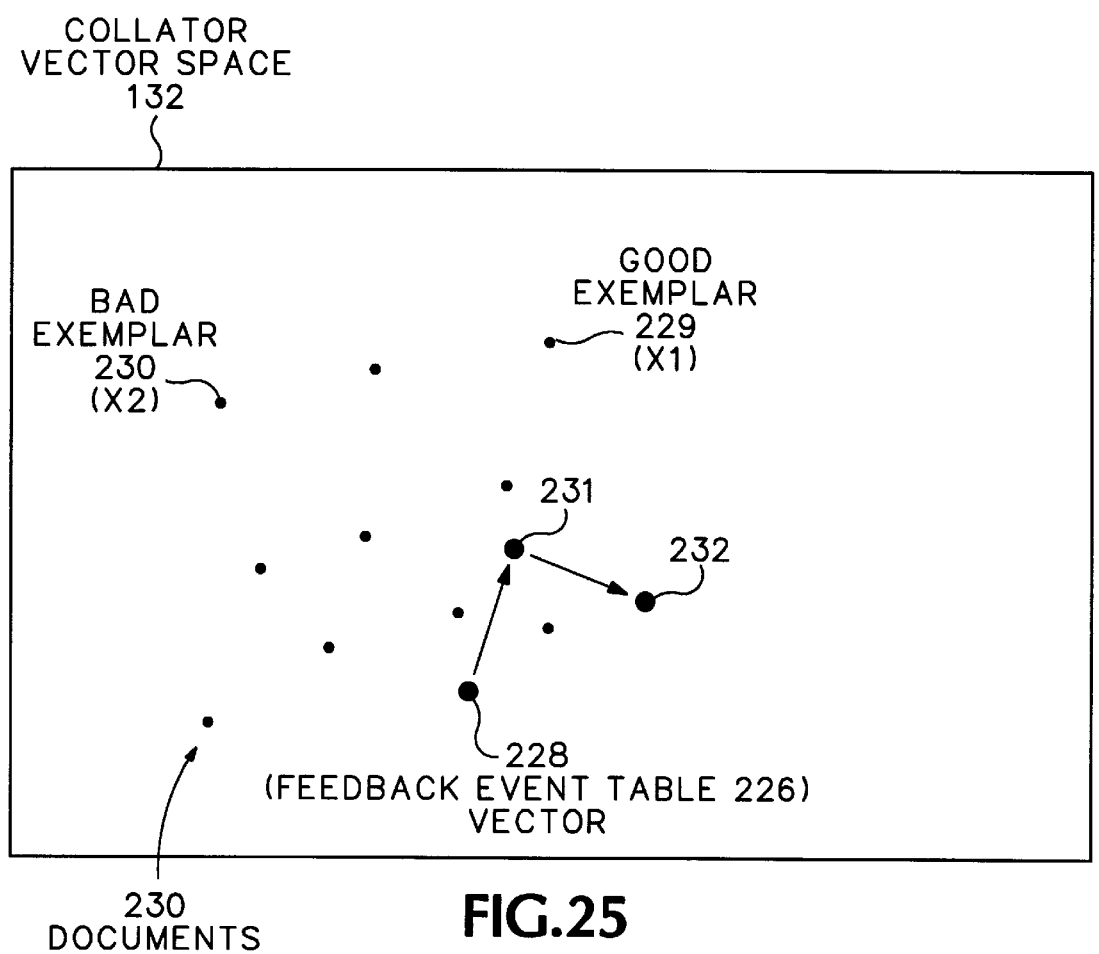
FIG. 25 shows the effect of user feedback on the positions of vectors mapped into the vector space of the collator shown in FIG. 9.

FIG. 25 is an example of how user feedback adjusts the position of a vector 228 in a collator vector space 132. Assume vector 228 represents the position of a FET 226 (FIG. 16) for user 86 (FIG. 14B). Now, if user 86 reads the document represented by vector X1 229 and provides positive feedback, a good exemplar (i.e., rating >0) is added to FET 226. The vector 228 corresponding to FET 226 then shifts in the direction of document X1 229, ending up at vector 231. If user 86 then removes the document represented by vector X2 from the user database 82 (FIG. 8), liaison 88 (FIG. 14B) infers negative feedback and adds a bad exemplar (i.e., rating <0) to FET 226. The vector 231 corresponding to FET 226 then shifts directly away from document X2 229, ending up at vector 232. Thus, over time, the FET vector 228 drifts to a position in collator vector space 132 capturing the concepts embodied in the good exemplars while avoiding the concepts embodied in the bad exemplars. In this way, the position of FET vector 228 captures user feedback expressed by feedback events in FETs 226.

FET vector 228 is derived by summing together the different document vectors identified in a user's feedback event table 226 (FIG. 16). The amount that the FET vector 228 moves toward any one document vector varies according to the rating assigned to the document in FET 226. A first document in the FET 226 may have a rating of +1.0 and a second document in the FET 226 may have a rating of −0.5. Therefore, the distance that the FET vector 228 moves toward the first document will be greater than the distance that the FET vector 228 moves away from the second document. Automated learning of an appropriate classification (e.g., "good" and "bad" classes) from example vectors is a general problem in pattern classification and is known to those skilled in the art. Three exemplary techniques are described in David D. Lewis, Robert E. Schapire, James P. Callan, and Ron Papka, 1996. "Training algorithms for linear text classifiers," in Hans-Peter Frei, Donna Harman, Peter Schauble, and Ross Wilkinson, (Eds.), *SIGIR '96:Proceedings of the 19th Annual International ACM SIGIR Conference on Research and Development in Information Retrieval, pages 298–306. Konstanz: Hartung-Gorre Verlag which is herein incorporated by reference.

User Query

Referring to FIGS. 14B and 21, a user query is initiated by liaison 88 in step 300. In step 302, user 86 or liaison 88 selects a single feedback event table 226 (FIG. 22). The particular FET 226 to query with is selected by user 86 or liaison 88 depending on the information needs of user 86. For example, user 86 may maintain two FETs 226, one for cancer-related documents and one for AIDS-related documents; the choice of which to use is based on the current information needs expressed by user 86. Alternatively, liaison 88 may periodically query with each of the FETs 226 for user 86. In step 304, the liaison 88 broadcasts the chosen FET identifier to collators 108 and requests a recommendations list 233 (FIG. 16) of similar documents. FETs 226 are described above in "Feedback Event Tables (FET)."

In step 306, collators 108 perform specialized query processing. For user queries, this specialized processing involves recalling the stored representation of the broadcast FET 226 (FIG. 22). As described above in "Feedback Event Tables" (FET), each collator vector space 132 (FIG. 9) maintains vector space representations of these FETs 226 (FET vectors). Function "p" 133 (FIG. 9) is then applied to the FET vector to map it into collator centroid space 134 (FIG. 9), a prerequisite for utilizing the "find_similar" function 352 (FIG. 15B) described above.

In step 268, collators 108 utilize the "find_similar" function 352 (FIG. 15B) to find similar documents and return a recommendations list 233 (FIG. 16) and query goodness score in step 270, as described above in "Query Processing by Collators." In step 272, liaison 88 merges the multiple recommendations lists 233 returned by multiple collators 108. The merge process is described above in "Recommendations Processing by Liaisons" and utilizes query goodness scores as weights. Finally, in step 274, the final list of documents is presented to user 86 via the graphical user interface or stored for later presentation to user 86. In this way, the IQE system 84 (FIG. 8) delivers relevant documents to user 86 based on the user's reading interests.

Social Query

A social query locates similar users in one of two ways. Type 1 social queries locate similar users with the help of collators 108 by matching the vector representations of users. Type 2 social queries locate similar users by comparing user profile data 82 (FIG. 8) with the assistance of KBS 112.

Type 1 Social Query

Figure 23:
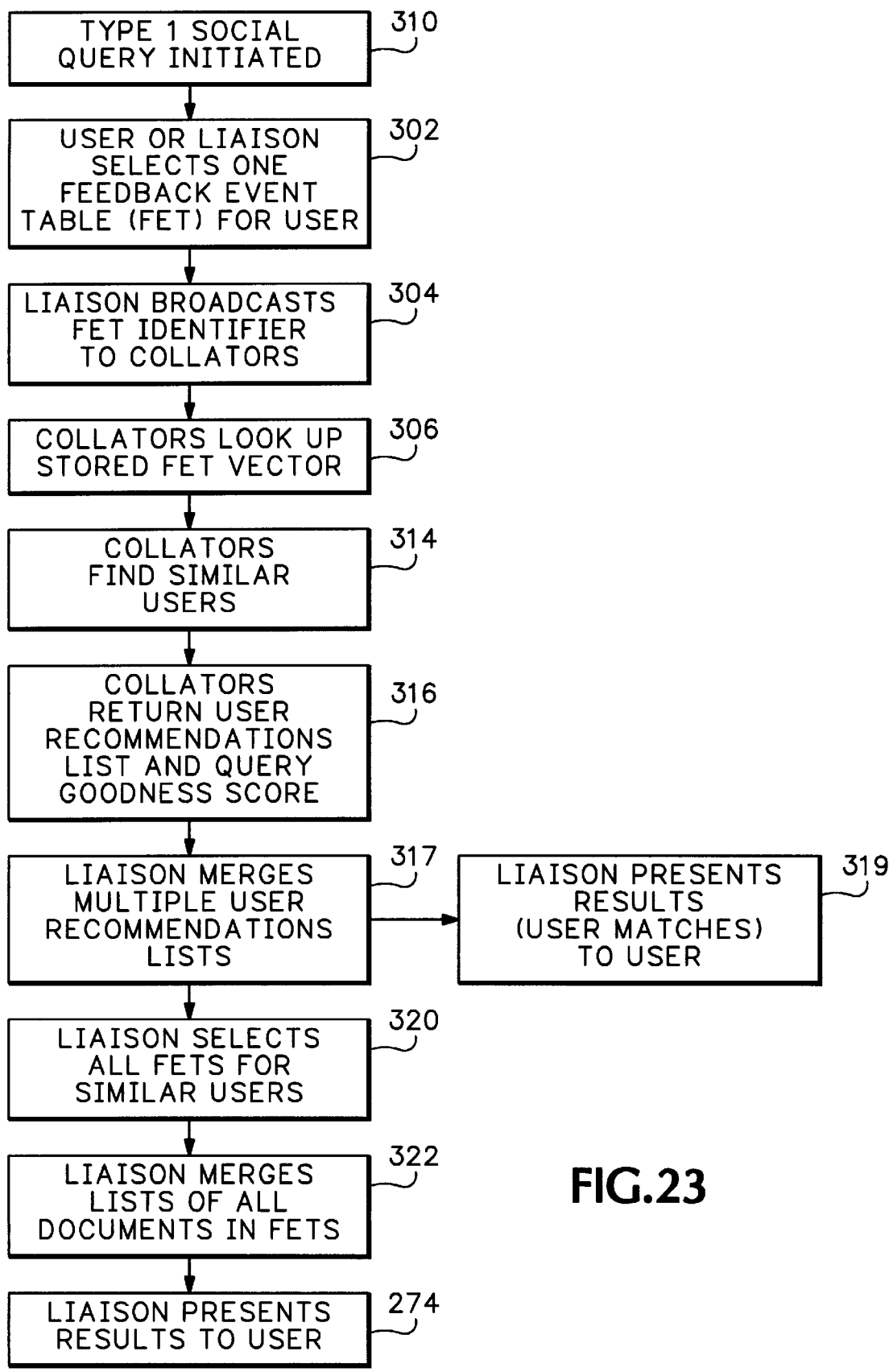
FIG. 23 is a step diagram showing the process of a type 1 social query.
Figure 24:
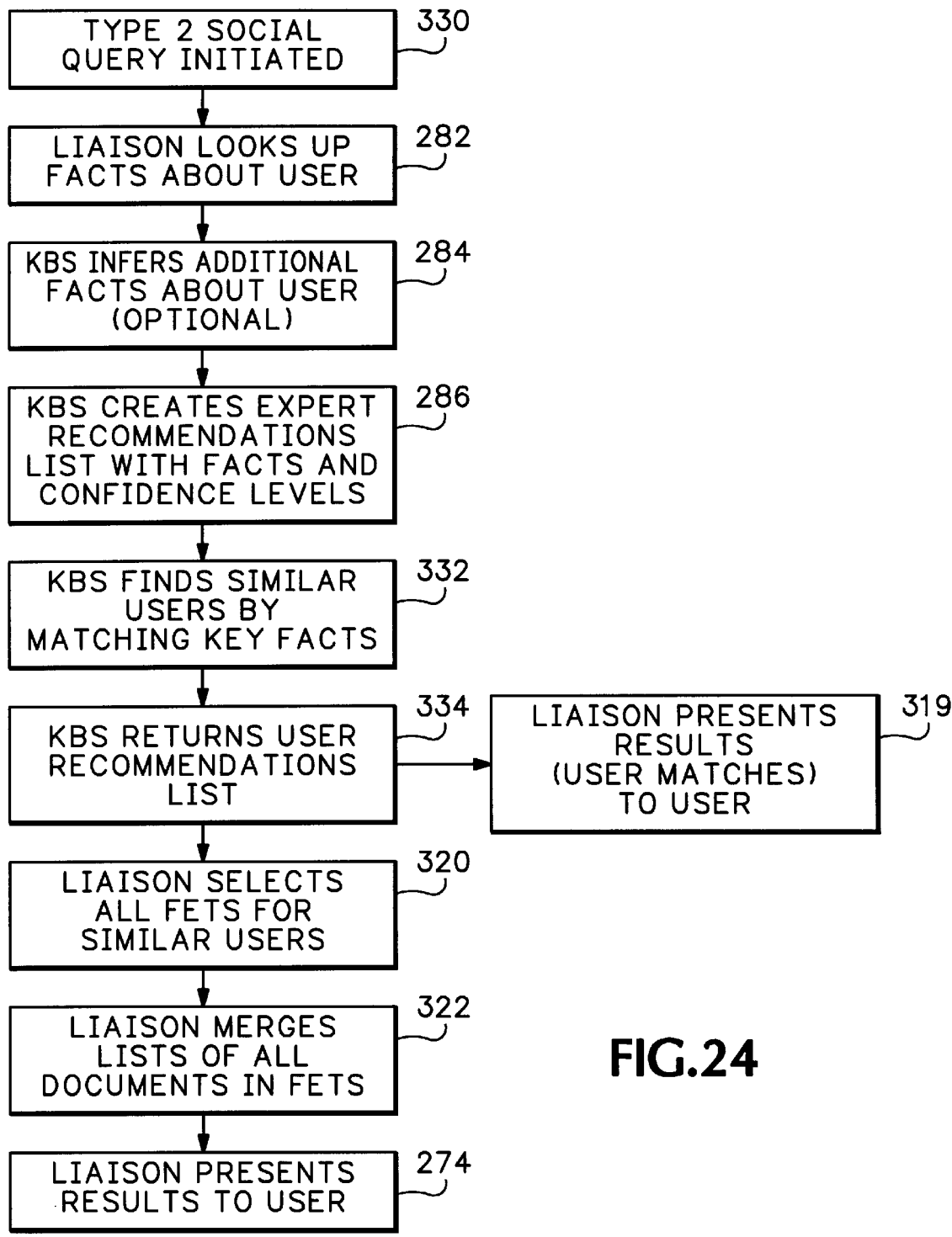
FIG. 24 is a step diagram showing the process of a type 2 social query.

Referring to FIGS. 14B and 23, a type 1 social query is initiated by liaison 88 in step 310. 30 In step 302, liaison 88 selects a single feedback event table 226 (FIG. 22) for user 86. In step 304, liaison 88 broadcasts the FET identifier for user 86 to collators 108 and requests a recommendations list 233 (FIG. 16) of similar users. Each FET identifier is broadcast as a separate query to collators 108 to keep distinct the query results for each FET 226. FETs 226 are described in detail above in "Feedback Event Tables (FET)."

In step 306, collators 108 perform specialized query processing. For type 1 social queries, this specialized processing involves recalling the stored representation of the broadcast FET identifier 226 (FIG. 22). Each collator vector space 132 (FIG. 9) maintains vector space representations of these FETs 226 (FET vectors). Function "p" 133 (FIG. 9) is then applied to the FET vector to map it into collator centroid space 134 (FIG. 9), a prerequisite for utilizing the "find_similar" function 352 (FIG. 15B) described above.

In step 314, collators 108 utilize the "find_similar" function 352 (FIG. 15B) to find similar users and return a recommendations list 233 (FIG. 16) and query goodness score in step 316, as described above in "Query Processing by Collators." Thus, similar users are found by comparing a FET vector for user 86 against other FET vectors representing the reading interests of other users. In step 317, liaison 88 merges the multiple recommendations lists 233 returned by multiple collators 108. The merge process is described above in "Recommendations Processing by Liaisons" and utilizes query goodness scores as weights. The resulting merged recommendations list 233 contains users similar to a single query corresponding to a single FET 226 for user 86.

Optionally, in step 319, the final list of similar users is presented to user 86 via the graphical user interface or stored for later presentation to user 86. In this way, the IQE system 84 (FIG. 8) identifies users similar to user 86 based on the similarity of their reading interests.

Once a final recommendations list 233 (FIG. 16) of users has been created by liaison 88, all FETs 226 (FIG. 22) of the most similar users are then selected in step 320 by liaison 88. In step 322, liaison 88 merges all of the selected FETs 226, utilizing the relevance scores of each user to weight the FETs 226. The result is a final recommendations list 233 of documents. Finally, in step 274, the final list of documents is presented to user 86 via the graphical user interface or stored for later presentation to user 86. In this way, the IQE system 84 (FIG. 8) delivers relevant documents to user 86 based on the reading interests of similar users.

Type 2 Social Query

Referring to FIGS. 14B and 24, a type 2 social query is initiated by liaison 88 in step 330. In step 282, liaison 88 calls knowledge-based system (KBS) 112 to look up facts about user 86. Then, optionally, KBS 112 infers additional facts about user 86 in step 284. Based on the facts about user 86, in step 286, KBS 112 creates an expert recommendations list 224 (FIG. 20) containing facts relevant to user 86 weighted by confidence levels for each fact. In step 332, KBS 112 locates similar users by matching key facts. "Key facts" are facts identified by user 86 as important via the graphical user interface; alternatively, key facts are identified as important in the domain-specific knowledge models applicable to user 86. As a result of matching key facts, KBS 112 returns a recommendations list 233 (FIG. 16) of similar users in step 334.

The recommendations list 233 returned by KBS 112 does not include an overall query goodness score but it does include relevance scores. The relevance scores are computed by summing the confidence levels of the key facts shared between users. For example, three key facts for user 86 are "diagnosed_with_breast_cancer," "interested_in_ alternative_treatments," and "has_children." If another user asserted the same facts with respective confidence levels 1.0, 0.7, and 0.0, the relevance score of that user would be 1.7. Optionally, in step 319, the final list of similar users is presented to user 86 via the graphical user interface or stored for later presentation to user 86. In this way, the IQE system 84 (FIG. 8) identifies users similar to user 86 based on the similarity of their user profile data 82 (FIG. 20) to that of user 86.

Once a recommendations list 233 of users has been returned by KBS 112, all feedback event tables (FETs) 226 (FIG. 22) of the most similar users are then selected in step 320 by liaison 88. In step 322, liaison 88 merges all of the FETs 226, utilizing the relevance scores of each user to weight that user's FETs 226. The result is a recommendations list 233 of documents. Finally, in step 274, the final list is presented to user 86 via the graphical user interface or stored for later presentation to user 86. In this way, the IQE system 84 (FIG. 8) delivers relevant documents to user 86 based on the reading interests of similar users as identified by the similarity of their user profile data 82 (FIG. 20) to that of user 86.

Having described and illustrated the principles of the invention in a preferred embodiment thereof, it should be apparent that the invention can be modified in arrangement and detail without departing from such principles. We claim all modifications and variation coming within the spirit and scope of the following claims.

What is claimed is:

1. An evolutionary system for identifying information, comprising:

multiple information sets each representing a portion of the information;

multiple collators each independently deriving vector spaces from associated information sets and identifying concepts in the vector spaces; and the multiple collators independently identifying information in the associated information sets according to the identified concepts in the vector spaces and competing against each other to identify relevant information in response to information queries.

2. A system according to claim 1 wherein the multiple collators each independently modify the associated information sets according to the relevancy of the identified information to the queries.

3. A system according to claim 1 wherein the multiple collators each include an associated goodness table ranking the similarity of information in the associated information sets to the concepts identified in the vector spaces.

4. A system according to claim 3 including a feedback event table used in combination with the goodness table to selectively terminate individual collators determined to be poor providers of relevant information in response to information queries.

5. A system according to claim 1 including a feedback event table that tracks user feedback on identified information.

6. A system according to claim 1 wherein the collators each have the following stages:
   a birth stage where the vector spaces for collators are created immaculately from a new set of information or created as offspring of existing collators;
   an adolescence stage where the collators respond to queries; and
   a maturity stage where the collators are evaluated as either fit for producing offspring by reverting back to the birth stage with a portion of the parenting collator's information set, or evaluated as unfit for survival wherein the associated information set is released for use by other collators.

7. A system according to claim 1 wherein the collators each include an associated centroid space identifying the concepts in the vector space.

8. A system according to claim 1 wherein the collators each include an associated goodness space identifying the similarity of information in the associated information sets to the concepts identified in the vector space.

9. A system according to claim 1 including a liaison that conducts the queries to the multiple collators on behalf of a user.

10. A system according to claim 9 wherein the liaison conducts any one of the following queries:
    a manual query wherein text from a user is converted into an index and broadcast to the collators, the collators then mapping the index into the associated vector spaces;
    a knowledge-based query wherein a knowledge-based system is used to convert queries from the user into an expert recommendations list that is mapped into the collators' associated vector spaces;
    a user query wherein a feedback event table associated with the user is mapped into the associated vector spaces of the collators;
    a type 1 social query wherein a feedback event table associated with the user is mapped into the associated vector spaces of the collators, the collators identifying a selected number of most similar feedback event tables for other users and then merging the user feedback event tables for the identified other users into the final information recommendations list; or
    a type 2 social query wherein profile data associated with the user is compared with profile data from other users and a set of feedback event tables for the other users with similar profile data is merged together forming a final information recommendations list.

11. A system according to claim 1 including multiple grinders converting the information into indices stored in the multiple information sets.

12. A system according to claim 11 including multiple slurpees each associated with a different source of information, the multiple slurpees converting each different source of information into a common format for the grinders.

13. A system according to claim 1 including multiple mites each selectively transporting information to the different information sets according to the similarity of the information to the concepts identified in the vector spaces of the collators.

14. A system according to claim 13 wherein the mites transport the information to the collators according to a goodness score generated by the collator indicating similarity of the information to the concepts in the associated vector space.

15. A method for identifying relevant information in an information source, comprising:
    converting different sets of information into different vector spaces;
    converting the vector spaces into associated centroid spaces that identify central concepts for the sets of information that comprise the vector spaces;
    independently identifying in each of the different centroid spaces the information clustered around the identified central concepts; and
    controlling genetic evolution for each of the vector spaces according to the similarity of the identified information to the central concepts.

16. A method according to claim 15 including generating an associated goodness space from each of the multiple centroid spaces that identifies how closely the information in the vector space matches the central concepts.

17. A method according to claim 15 wherein controlling the vector spaces includes automatically deleting vector spaces that are unsuccessful over time in identifying information similar to the central concepts.

18. A method according to claim 17 wherein controlling the vector spaces includes generating offspring for selected vector spaces that are successful over time in identifying information similar to the central concepts, the offspring comprising a subset of information in the selected vector spaces that most closely relate to the concepts identified in the associated vector spaces.

19. A method according to claim 15 wherein identifying the information includes the following:
    receiving information queries;
    mapping the information queries into the different vector spaces;
    identifying which concepts in the vector spaces map closest to the information queries;
    identifying the information closest to the identified concepts; and
    supplying the identified information to a user.

20. A method according to claim 15 including selectively populating information into the vector spaces according to how similar the information is to the concepts identified in the associated vector spaces.

21. A method according to claim 15 including conducting a manual query as follows:
    converting text from a user into a query index;
    broadcasting the query index to the different vector spaces;
    mapping the query index into the different vector spaces;
    identifying a predetermined number of central concepts in each of the vector spaces most similar to the query index;
    identifying the information in each of the vector spaces within a predetermined distance of the identified closest central concepts;
    determining relevance scores representing semantic distances of the identified information from the query index;
    generating a query goodness score identifying how closely the query index relates to the central concepts for each of the vector spaces; and returning recommendations lists from each of the vector spaces containing the identified information, the relevance scores for the identified information, and the associated goodness score of the query index.

22. A method according to claim 21 including merging the recommendations lists from each of the collators by weighting each of the relevance scores by the associated goodness score and averaging the weighted relevance scores for the same identified information from different vector spaces.

23. A method according to claim 15 including conducting a knowledge-based query according to the following:
retrieving user profile data;
creating an expert recommendations list from the profile data containing facts relevant to the user weighted by confidence levels for each fact;
broadcasting an identifier for each fact to the different vector spaces;
mapping the fact into the vector spaces; and
identifying information in each of the vector spaces similar to the fact.

24. A method according to claim 23 including:
deriving a starting set of facts from the user profile;
generating inferred facts from the set of facts according to a set of rules;
generating a confidence level for each of the inferred facts according to a knowledge tree; and
generating an expert recommendations list by identifying only the inferred facts above a predetermined confidence level.

25. A method according to claim 15 including;
generating a feedback event table that rates a set of information according to user feedback on the identified information;
mapping the set of information in the feedback event table into each vector space; and
locating a feedback event table vector in each vector space according to the mapped set of information and the ratings associated with the information.

26. A method according to claim 25 including conducting a user query as follows:
identifying a feedback event table associated with the user;
broadcasting the identified feedback event table to the vector spaces;
recalling feedback event table vectors in the vector spaces for the identified feedback event table; and
identifying information in each vector space similar to the feedback event table vectors.

27. A method according to claim 25 including conducting a type 1 social query as follows:
identifying a feedback event table for the user;
broadcasting the identified feedback event table to the vector spaces;
mapping the feedback event table vector into the vector spaces;
locating other similar feedback event table vectors representing reading interests of other users;
generating a goodness score from each of the vector spaces indicating how closely related the feedback event table vector is to the central concepts of the vector spaces; and
generating a recommendations list from each one of the vector spaces listing the other users with the most similar feedback event table vectors and the goodness score.

28. A method according to claim 15 including conducting a type 2 social query as follows:
calling up a knowledge-based system to look up facts about the user;
creating an expert recommendations list containing facts relevant to the user weighted by confidence levels for each fact;
identifying a subset of key facts in the expert recommendations list;
locating other users according to similarity of the key facts and the confidence levels of the similar key facts;
generating a recommendations list by the knowledge-based system of the identified similar users.

29. A method according to claim 28 including selecting feedback event tables of the most similar identified users and merging the information identified in the feedback event tables together to form a recommendations list.

30. A genetic system for information retrieval and information categorization, comprising:
a corpus of information;
a multidimensional vector space derived from the corpus of information, the vector space comprising a set of axes that locate contextual relationships in the corpus of information;
a centroid space that locates central concepts in the vector space; and
a collator that automatically controls evolution of the vector space over time according to the relevancy of the central concepts to information queries.

31. A system according to claim 30 including a goodness space derived from the centroid space that identifies how closely information in the corpus relates to the central concepts identified in the vector space.

32. A system according to claim 30 wherein the collator is terminated when the central concepts are not identified as relevant to the information queries for a given period of time.

33. A system according to claim 30 wherein the corpus includes profile data from multiple users and the vector space derived from the information corpus identifies information relevant to the multiple users.

34. A system according to claim 30 wherein the centroid space classifies the multiple users into groups having similar profile characteristics and informational interests.

35. A system according to claim 30 including one or more mites that selectively transport information to the corpus from different information sources according to the similarity of the information to the central concepts in the vector space.

36. A system according to claim 30 including a liaison that continuously queries the collator for information and maintains a user feedback event table ranking the relevancy of the information suggested by the collator in response to the queries.

37. A system according to claim 30 wherein the collator comprises the following:
a birth stage where the collator forms the corpus of information and generates a vector space that identifies central concepts in the information corpus;
an adolescence phase where the collator identifies information in the information corpus in response to queries and selectively searches and adds new information to the information corpus according to similarity of the new information to the information corpus, the collator identifying information during queries according to the similarly of the query to the central concepts; and a maturity phase where the collator either dies checking the information corpus back into an information source or reproduces maintaining a first portion of the information corpus most similar to the central concepts and discarding a second portion of the information corpus least similar to the central concepts.

38. A system according to claim 30 wherein the collator automatically spawns an offspring vector space when the collator is successful over time in identifying information relevant to the information queries, the offspring comprising a subset of information in the vector spaces that most closely relate to the central concepts identified in the associated vector spaces.

39. A method for processing queries in an information retrieval system, comprising;
   initiating selectable query modes;
   generating a query according to the query modes selected;
   identifying the concepts in the information set most similar to the query;
   identifying the information in the information set most closely clustered around the identified concepts;
   generating a goodness score indicating how closely the query relates to the identified concepts;
   combining the identified information and the goodness score into a recommendations list;
   wherein one of the query modes comprises a knowledge-based query including;
   retrieving user profile data;
   creating an expert recommendations list from the profile data containing facts relevant to the user weighted by confidence levels;
   broadcasting an identifier for each fact separately to the collator;
   recalling stored topic vectors representing the fact identifiers in the collator; and
   identifying information in the collator similar to each of the topic vectors.

40. A method for processing queries in an information retrieval system, comprising;
   initiating selectable query modes;
   generating a query according to the query modes selected;
   identifying the concepts in the information set most similar to the query;
   identifying the information in the information set most closely clustered around the identified concepts;
   generating a goodness score indicating how closely the query relates to the identified concepts;
   combining the identified information and the goodness score into a recommendations list;
   wherein one of the query modes comprises a user query including:
     identifying a feedback event table for a user;
     broadcasting the identified feedback event table to the collator;
     recalling a feedback event table vector in the collator for the identified feedback event table; and
     identifying information in the collator similar to the feedback event vector.

41. A method for processing queries in an information retrieval system, comprising;
   initiating selectable query modes;
   generating a query according to the query modes selected;
   identifying the concepts in the information set most similar to the query;
   identifying the information in the information set most closely clustered around the identified concepts;
   generating a goodness score indicating how closely the query relates to the identified concepts;
   combining the identified information and the goodness score into a recommendations list;
   wherein one of the query modes comprises a type 1 social query including;
     generating a feedback event table rating information according to its relevancy to previous queries;
     mapping the information in the feedback event table into the collator;
     identifyg a feedback event table vector in the collator according to the mapped set of information and the rating associated with the information;
     locating in the collator other similar feedback event table vectors representing reading interests of other users;
     generating a goodness score for the collator indicating how closely the feedback event table vector for the user relates to the central concepts of the collator; and
     generating a recommendations list for the user listing the feedback event tables for the most similar other users and the goodness score.

42. A method for processing queries in an information retrieval system, comprising;
   initiating selectable query modes;
   generating a query according to the query modes selected;
   identifying the concepts in the information set most similar to the query;
   identifying the information in the information set most closely clustered around the identified concepts;
   generating a goodness score indicating how closely the query relates to the identified concepts;
   combining the identified information and the goodness score into a recommendations list;
   wherein one of the query modes comprises a type 2 social query as follows:
     using a knowledge-based system to look up facts about the user;
     creating an expert recommendations list containing facts relevant to the user weighted by confidence levels;
     identifying a key set of facts in the expert recommendations list;
     locating other users according to similarity of the key facts and the confidence levels of the similar key facts; and
     returning a recommendations list by the knowledge-based system of the identified similar users.

43. A method for categorizing users in an information retrieval system, comprising:
   mapping reading histories for multiple users into multiple vector spaces;
   identifying central concepts in the vector spaces;
   mapping a reading history for a target user into the multiple vector spaces;
   identifying which central concepts are most relevant to the reading history of the target user;
   generating a recommendations list identifying the users most closely clustered; and
   wherein mapping reading histories of multiple users includes:
     maintaining a feedback event table identifying information supplied to the users during previous queries;

ranking the information in the feedback event table according to the relevance of the information to the previous queries;

mapping the information into the vector spaces;

generating a feedback event table vector that is located in the vector spaces according to the mapped information and the ratings associated with the mapped information;

locating similar feedback event table vectors in the vector spaces for other users; and generating a recommendations list identifying the similar uses.

44. A method for adapting a semantic space comprising:

generating the semantic space from a resident set of information;

continuously checking for new information that become available in the information source;

computing a goodness value that characterizes the closeness of the new information to concepts in the semantic space for the resident set of information; and automatically adding the new information to the resident set of information when the goodness value meets a given threshold.

45. A method according to claim 44 including providing a mite that checks information in and out of the information source through a queue and selectively submits the information to the semantic space according to the goodness value generated by the semantic space.

46. A method according to claim 44 including automatically terminating the semantic space according to both similarity of the information in the semantic space to central concepts identified in the semantic space and according to user feedback event tables that identify how closely the information in the semantic space relates to previous queries.

47. A method according to claim 44 including the following steps:

at periodic times automatically removing information in the resident set of information that ranks in a lowest percentile of goodness scores; and regenerating the semantic space with the remaining resident set of information.

48. A system for classifying information, comprising;

a knowledge-based system that includes facts and sets of rules over the facts, the knowledge-based system inferring facts from initial information, assigning confidence levels for each of the inferred facts, and identifying key facts according to the assigned confidence levels;

an artificial neural network that converts a corpus of information into a multidimensional vector space having a set of axes that locate contextual relationships in the corpus of information, the neural network receiving a key fact from the knowledge-based system, mapping the key fact into the vector space, and identifying information in the vector space similar to the key fact; and an information processor for representing, storing, and incrementally improving the representations of facts from the knowledge-based system within the vector space of the neural network.

* * * * *